(12) United States Patent
Sakamoto et al.

(10) Patent No.: US 11,070,722 B2
(45) Date of Patent: Jul. 20, 2021

(54) IMAGE CAPTURING DEVICE AND CONTROL METHOD

(71) Applicant: OLYMPUS CORPORATION, Tokyo (JP)

(72) Inventors: Joji Sakamoto, Hachioji (JP); Masanori Mitsui, Machida (JP); Takuji Horie, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/739,858

(22) Filed: Jan. 10, 2020

(65) Prior Publication Data

US 2020/0154038 A1    May 14, 2020

Related U.S. Application Data

(63) Continuation of application No. PCT/JP2017/027943, filed on Aug. 1, 2017.

(51) Int. Cl.
*H04N 5/232* (2006.01)
*H04N 5/225* (2006.01)

(52) U.S. Cl.
CPC ....... *H04N 5/23227* (2018.08); *H04N 5/2256* (2013.01)

(58) Field of Classification Search
CPC ............. H04N 5/2256; H04N 5/23227; H04N 5/23229; H04N 5/2354; H04N 9/07; G03B 11/00; G03B 15/00; G03B 15/02
See application file for complete search history.

(56) References Cited

U.S. PATENT DOCUMENTS 8,619,155 B2 * 12/2013 Nakagawara .......... H05B 45/22
348/223.1
9,404,850 B2    8/2016 Mitsu
(Continued)

FOREIGN PATENT DOCUMENTS

| JP | 2012-154628 A1 | 8/2012 |
| JP | 2012-244277 A | 12/2012 |
| JP | 2015-127777 A | 7/2015 |

OTHER PUBLICATIONS

International Search Report dated Oct. 24, 2017 received in PCT/JP2017/027943.

*Primary Examiner* — Chiawei Chen
(74) *Attorney, Agent, or Firm* — Scully, Scott, Murphy & Presser, P.C.

(57) ABSTRACT

An image capturing device includes: an illuminator configured to generate illumination light composed of components at a plurality of wavelength bands, each of the components having a characteristic in accordance with a corresponding one of settings; an imager configured to generate an image signal by capturing light from a subject; and a processor. The processor is configured to: set an acquisition condition for acquiring spectral information of the subject, the acquisition condition including a condition related to an operation of each of the illuminator and the imager; analyze the image signal generated by the imager based on the acquisition condition in order to acquire the spectral information of the subject; determine whether or not the acquired spectral information satisfies an end condition for ending acquisition of the spectral information; and change the acquisition condition when the processor determines that the end condition is not satisfied.

5 Claims, 13 Drawing Sheets

(56) References Cited

U.S. PATENT DOCUMENTS

| | | | |
|---|---|---|---|
| 9,479,707 B2* | 10/2016 | Sako | G03B 15/05 |
| 9,528,878 B2 | 12/2016 | Mitsui | |
| 9,945,721 B2* | 4/2018 | Abolbashari | G01J 3/2823 |
| 10,007,109 B2* | 6/2018 | Abolbashari | G02B 21/0064 |
| 2005/0228231 A1* | 10/2005 | MacKinnon | G02B 23/2461 |
| | | | 600/180 |
| 2005/0254704 A1* | 11/2005 | Komiya | H04N 9/045 |
| | | | 382/162 |
| 2006/0067668 A1* | 3/2006 | Kita | G03B 33/00 |
| | | | 396/182 |
| 2006/0133061 A1* | 6/2006 | Maeda | H04N 5/2354 |
| | | | 362/6 |
| 2006/0170319 A1* | 8/2006 | Oku | G02F 1/133606 |
| | | | 313/116 |
| 2007/0196095 A1* | 8/2007 | Perala | H04N 9/735 |
| | | | 396/155 |
| 2012/0189290 A1* | 7/2012 | Osawa | G03B 7/28 |
| | | | 396/157 |
| 2015/0002735 A1* | 1/2015 | Moskovchenko | H04N 9/73 |
| | | | 348/370 |
| 2015/0272422 A1* | 10/2015 | Aoyama | A61B 1/0638 |
| | | | 348/68 |
| 2016/0088278 A1* | 3/2016 | Velarde | G03B 15/03 |
| | | | 348/371 |
| 2016/0187199 A1* | 6/2016 | Brunk | H04N 9/045 |
| | | | 348/89 |
| 2017/0014022 A1* | 1/2017 | Tamura | A61B 1/063 |
| 2017/0180695 A1* | 6/2017 | Tanaka | H04N 5/2256 |
| 2017/0366715 A1* | 12/2017 | Moskovchenko | H04N 5/2256 |
| 2018/0359465 A1* | 12/2018 | Segapelli | H04N 17/002 |
| 2019/0014638 A1* | 1/2019 | Weaver | H04N 9/045 |

\* cited by examiner

IMAGE CAPTURING DEVICE AND CONTROL METHOD

This application is a continuation of International Application No. PCT/JP2017/027943, filed on Aug. 1, 2017, the entire contents of which are incorporated herein by reference.

BACKGROUND

The present disclosure relates to an image capturing device and a control method.

In the related art, a multiband spectral image including three primary colors of R, G, and B has high resolution in color or wavelength direction, and thus is used for high color reproduction, an analysis of a subject, or the like. As a technique for acquiring highly accurate spectral information from such a spectral image, there is known a technique for setting an acquisition condition based on an image that a user desirably selects from a plurality of images acquired by irradiating the subject with different illumination light (see, for example, JP 2015-127777 A).

However, with the technique described above, it is not possible to set the acquisition condition for acquiring the spectral information in accordance with a spectral characteristic of the subject. In view of the above, there is disclosed a technique for including a spectrometry unit configured to measure the spectral characteristic of the subject and for capturing the spectral image by setting the acquisition condition based on the measurement result (see, for example, JP 5806504 B2).

SUMMARY

According to one aspect of the present disclosure, there is provided an image capturing device including: an illuminator configured to generate illumination light composed of components at a plurality of wavelength bands, each of the components having a characteristic in accordance with a corresponding one of settings; an imager configured to generate an image signal by capturing light from a subject; and a processor including hardware, the processor being configured to: set an acquisition condition for acquiring spectral information of the subject, the acquisition condition including a condition related to an operation of each of the illuminator and the imager; analyze the image signal generated by the imager based on the acquisition condition in order to acquire the spectral information of the subject; determine whether or not the acquired spectral information satisfies an end condition for ending acquisition of the spectral information; and change the acquisition condition for acquiring the spectral information when the processor determines that the end condition is not satisfied.

The above and other features, advantages and technical and industrial significance of this disclosure will be better understood by reading the following detailed description of presently preferred embodiments of the disclosure, when considered in connection with the accompanying drawings.

DETAILED DESCRIPTION

Each embodiment (hereinafter, referred to as the embodiment) will be described below with reference to the appended drawings.

First Embodiment

Figure 1:
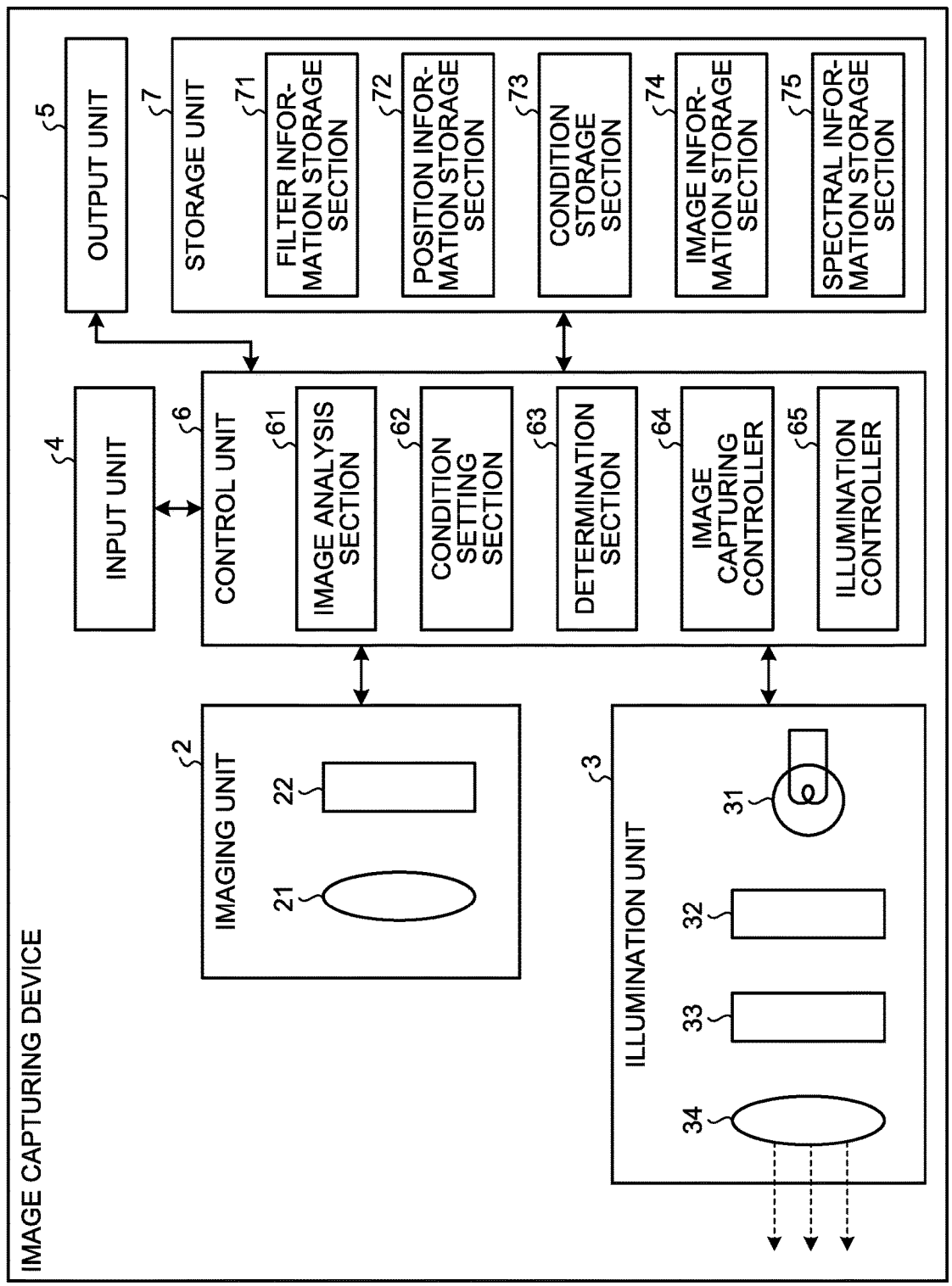
FIG. 1 is a block diagram illustrating a configuration of an image capturing device according to a first embodiment.

FIG. 1 is a block diagram illustrating a configuration of an image capturing device according to the first embodiment. An image capturing device 1 illustrated in FIG. 1 includes an imaging unit 2, an illumination unit 3, an input unit 4, an output unit 5, a control unit 6, and a storage unit 7.

The imaging unit 2 includes an imaging optical system 21 and an imaging element 22. The imaging optical system 21 collects light from a subject to form an image. The imaging element 22 performs photoelectric conversion on the light, which the imaging optical system 21 collects from the subject to form the image, to generate an image signal. The imaging optical system 21 is constituted by a single lens or a plurality of lenses. The imaging element 22 is constituted by, for example, a monochrome image sensor such as a charge coupled device (CCD) or a complementary metal oxide semiconductor (CMOS). The imaging element 22 may be an image sensor having a color filter of R, G, and B, or a multiband image sensor having four or more bands.

The illumination unit 3 includes a light source 31, a wavelength selection filter (linear variable filter; hereinafter, referred to as an LVF) 32, a liquid crystal section 33, and a diffusion optical system 34. The light source 31 emits white light, and the LVF 32 of a flat plate shape transmits the white light at a transmission wavelength varying in accordance with an incident position of the white light. The liquid crystal section 33, located closer to a light exiting side of the LVF 32, selectively transmits light at a predetermined wavelength band among the light transmitted through the LVF 32. The diffusion optical system 34, located closer to a light exiting side of the liquid crystal section 33, diffuses the light transmitted through the liquid crystal section 33 to equalize the light and emits the light as illumination light.

The light source 31 emits the white light by using, for example, a light emitting diode (LED) device or a laser light source. The light source 31 may be configured to emit white LED light or white laser light. Alternatively, the light source 31 may be configured to emit the white light in combination of LED light or laser light, each including red (R), green (G), and blue (B) beams, or more beams. The light source 31 may also be constituted by a xenon lamp, a halogen lamp, or the like.

Figure 2:
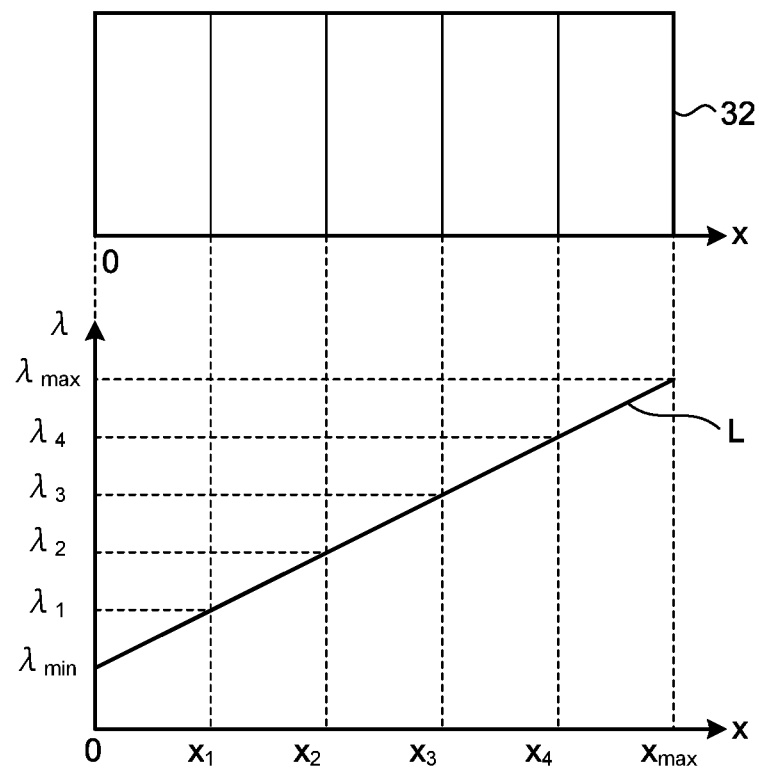
FIG. 2 schematically illustrates a characteristic of a wavelength selection filter.

The LVF 32 is flat-plate shaped and transmits the light at a transmission center wavelength that continuously changes in a direction predetermined on a main surface of the LVF 32. FIG. 2 schematically illustrates a characteristic of the LVF 32, indicating a relationship between each position of the light in the filter and the transmission center wavelength having highest transmittance at the position. In FIG. 2, a direction extending left to right and in parallel to two opposite sides of the LVF 32 is referred to as an x-axis direction. In FIG. 2, the light positioned at a left end of the LVF 32 is at x=0, and the light positioned at a right end of the LVF 32 is at $x=x_{max}$. In the LVF 32, as the position of the light in the x-axis direction changes from x=0 toward $x=x_{max}$, the transmission center wavelength λ at each of the positions continuously and linearly increases (see a straight line L in FIG. 2). The wavelength band of $\lambda_{min} \leq \lambda \leq \lambda_{max}$ represents a visible light region. For example, the transmission center wavelength $\lambda_{min}$ at x=0 (the left end of the LVF 32) equals 380 nm, and the transmission center wavelength $\lambda_{max}$ at $x=x_{max}$ (the right end of the LVF 32) equals 780 nm. In FIG. 2, the transmission center wavelength at $x=x_n$ (n=1 to 4; $0<x_n<x_{max}$) is expressed as $\lambda_n$. Each of four lines extending vertically in LVF 32 in FIG. 2 is a virtual line that connects positions of the light having an equal wavelength band. These lines each extend orthogonally to the x-axis direction in FIG. 2 as the direction in which the transmission center wavelength changes.

Figure 3:
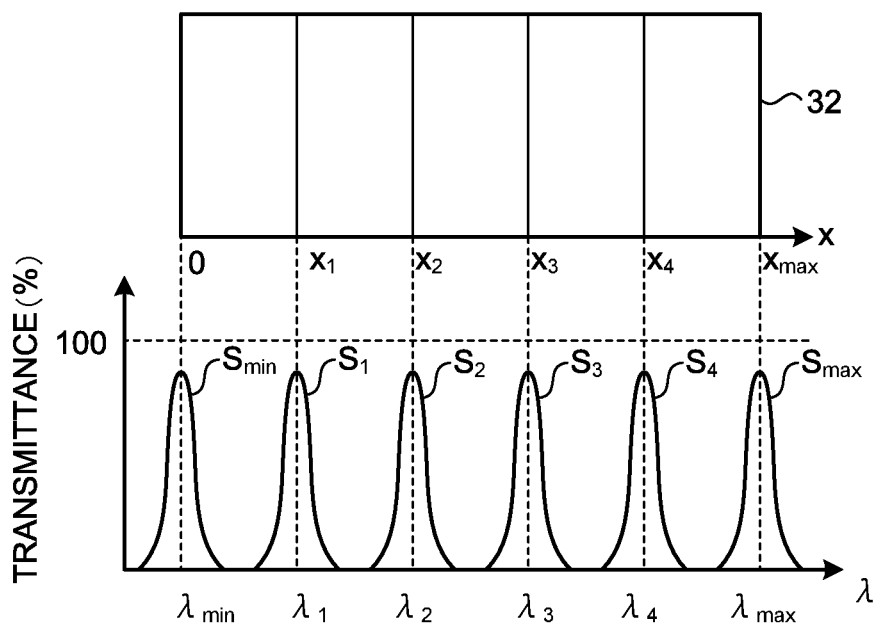
FIG. 3 schematically illustrates transmittance of light at a typical position of the wavelength selection filter.

FIG. 3 schematically illustrates the transmittance of the light at each typical position of LVF 32. FIG. 3 schematically illustrates the transmittance of the light transmitted at each of x=0, $x_n$ (n=1 to 4), and $x_{max}$. For example, a spectrum $S_{min}$ of the light transmitted at x=0 has the transmission center wavelength $\lambda_{min}$. Similarly, a spectrum $S_n$ of the light transmitted at $x=x_n$ has the transmission center wavelength $\lambda_n$, and a spectrum $S_{max}$ of the light transmitted at $x=x_{max}$ has the transmission center wavelength $\lambda_{max}$. As clearly seen in FIG. 3, the spectrum of the light transmitted at each of the positions in the LVF 32 has substantially uniform transmittance at the transmission center wavelength, and has a substantially uniform wavelength band width.

The illumination unit 3 may be constituted by other types of filters in addition to an LVF. For example, the illumination unit 3 may employ a multi-color LED light source, in which a plurality of LEDs, each emitting light in four or more colors at a different wavelength band, are two-dimensionally arranged and aligned.

The liquid crystal section 33 is located closer to the light exiting side of the LVF 32, and employs a liquid crystal panel capable of selectively emitting the light at the predetermined wavelength band among the light transmitted through the LVF 32. The liquid crystal section 33 is under control of the control unit 6 and varies a liquid crystal module state in each region to selectively switch between transmission and non-transmission of the light in accordance with the incident position of the light. The transmission wavelength band of the light transmitted through the LVF 32 and the incident position of the light in the liquid crystal section 33 correspond to each other, and are stored in a position information storage section 72 of the storage unit 7 as will be described later.

Figure 4:
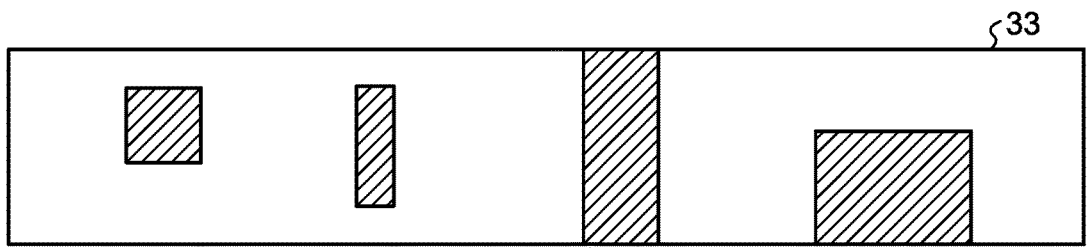
FIG. 4 illustrates an example of a region in a liquid crystal section that is selected to transmit the light.

FIG. 4 illustrates an example of a region in the liquid crystal section 33 selected to transmit the light. In FIG. 4, the region selected to transmit the light is schematically illustrated by hatched line. A direction extending left to right corresponds to the direction in which the wavelength changes in the LVF 32. Each of the regions selected to transmit the light has a width in the direction extending left to right, and the width corresponds to a size of the wavelength band of the light transmitted. In FIG. 4, a height of top to bottom corresponds to a light intensity of the light transmitted. For example, among the regions selected to transmit the light, the region as the second from the right in FIG. 4 extends through top and bottom and thus transmits light at a highest light intensity level (longest wavelength component). Each of the regions selected to transmit the light may have other shapes in addition to a rectangular shape.

The diffusion optical system 34 is constituted by, for example, a diffusion plate for diffusing luminous flux, and an optical element for equalizing the luminous flux diffused by the diffusion plate. The diffusion optical system 34 is configured to diffuse the light transmitted through the liquid crystal section 33 to equalize an illuminance distribution of the light, and configured to irradiate the subject with the luminous flux as the illumination light.

The illumination unit 3 generates the illumination light composed of the components at the plurality of different wavelength bands, each of the components having a characteristic in accordance with the corresponding setting. The illumination unit 3 sequentially (in a time-divided way) emits the illumination light including each of the components. Each of the components included in the illumination light has the different wavelength bands, and the number of the wavelength bands as well as a half width of each of the wavelength bands may be inputted by a user into the input unit 4 for setting.

The input unit 4 receives various input signals including an instruction signal for operating the image capturing device 1. The input unit 4 includes an input device such as a keyboard, various buttons, or various switches, and a pointing device such as a mouse or a touch panel. The input unit 4 receives signals externally inputted by operating these devices, and outputs the signals to the control unit 6. The input unit 4 may also employ a sound input microphone.

The output unit 5 outputs various information including an image corresponding to the image signal generated by the imaging unit 2. The output unit 5 includes a monitor, e.g., liquid crystal or organic electro luminescence (EL), for outputting the various information including an image or a character, and a speaker for outputting sound.

The control unit 6 includes an image analysis section 61, a condition setting section 62, a determination section 63, an image capturing controller 64, and an illumination controller 65.

The image analysis section 61 analyzes the image based on the image signal generated by the imaging unit 2 for output in order to acquire spectral information of the subject. Specifically, the image analysis section 61 calculates an average of pixel signal values in a region of interest (ROI) predetermined in the image that corresponds to the image signal. Then, the image analysis section 61 stores the average as the spectral information into the storage unit 7 where the spectral information is in correspondence to the wavelength component of the illumination light applied to capture the image. The region of interest (ROI) is set when the input unit 4 receives an input. The ROI may be an entire part of the image. The image analysis section 61 may calculate a statistic, such as a maximum or a mode, of the pixel signal values in the ROI, instead of the average of the pixel signal values in the ROI. Hereinafter, the statistic of the pixel signal values in the ROI as the spectral information will be referred to as a "spectral signal value".

The condition setting section 62 sets an image capturing condition for the imaging unit 2 and outputs the image capturing condition to the image capturing controller 64. The condition setting section 62 concurrently sets an illumination condition for the illumination unit 3 and outputs the illumination condition to the illumination controller 65. The image capturing condition includes a frame rate for capturing each image, and the like. The Illumination condition includes the number of bands, a center wavelength of each of the bands, a half width of each of the bands, and the like of the illumination light applied to capture each image. The image capturing condition and the illumination condition constitute a spectral information acquisition condition, and are correlated to each other. For example, whenever the illumination unit 3 sequentially (in a time-divided way) applies the illumination light including each of the components and thus switches the illumination light at each band, the imaging unit 2 captures the image to generate the image signal for output.

The condition setting section 62 changes the spectral information acquisition condition in accordance with a determination result from the determination section 63 as will be described later. When changing the acquisition condition, the condition setting section 62 changes sensitivity at at least some of the wavelength bands of the image signal. Specifically, the condition setting section 62 increases maximum light intensity of a band, the band having the spectral signal value smaller than a threshold value predetermined, in accordance with a predetermined rule. The predetermined rule is indicated by, for example, a function of the maximum light intensity before the change.

The determination section 63 determines whether or not the spectral information acquired by the image analysis section 61 based on pre-image capturing satisfies an end condition for ending the acquisition of spectral information based on the pre-image capturing. The end condition in the first embodiment is, for example, "each of the spectral signal values is greater than the threshold value predetermined". When the determination section 63 determines that the end condition is not satisfied, the condition setting section 62 changes the spectral information acquisition condition based on the determination result.

The image capturing controller 64 controls an operation of capturing the image in the imaging unit 2 based on the image capturing condition set by the condition setting section 62.

The illumination controller 65 synchronizes with the image capturing controller 64 and controls an operation of the illumination unit 3 based on the illumination condition set by the condition setting section 62. Specifically, the illumination controller 65 controls the state of the liquid crystal section 33 at a predetermined timing, so that the liquid crystal section 33 is controlled to select a pattern of transmitting the light (component) at each of the wavelengths. As a result, the illumination unit 3 sequentially (in a time-divided way) emits the illumination light of multiband.

The control unit 6 is constituted by, for example, a general processor such as a central processing unit (CPU), or a specialized integrated circuit for performing a specific function, such as an application specific integrated circuit (ASIC) or a field programmable gate array (FPGA). The control unit 6 reads various programs stored in the storage unit 7 to perform various arithmetic processes in the image capturing device 1.

The storage unit 7 includes a filter information storage section 71, the position information storage section 72, a condition storage section 73, an image information storage section 74, and a spectral information storage section 75. The filter information storage section 71 stores a transmission characteristic including the wavelength band of the light transmitted at each of the positions in the LVF 32. The position information storage section 72 stores each of the positions in the LVF 32 at which the light transmits, and the incident position of the light in the liquid crystal section 33 in correspondence to each of the positions in the LVF 32 at which the light transmits. The condition storage section 73 stores the spectral information acquisition condition in the pre-image capturing, information with regard to a change of the acquisition condition, the end condition for ending the spectral information acquisition in the pre-image capturing, and an image capturing condition. The image information storage section 74 stores the image signal that the imaging unit 2 generates by capturing the image. The spectral information storage section 75 stores the spectral information acquired by the image analysis section 61.

The storage unit 7 stores the plurality of programs and various setting information that the control unit 6 executes. The programs may be written and stored in a computer readable recording medium. The programs may be written in the storage unit 7 or the computer readable recording medium when shipping the computer or the recording medium as a product. Alternatively, the programs may be written by downloading via communication network.

The storage unit 7 is constituted by a volatile memory such as a random access memory (RAM), and a nonvolatile memory such as a read only memory (ROM). Alternatively, the storage unit 7 may be constituted by an externally mountable and computer readable recording medium, such as a memory card.

Figure 5:
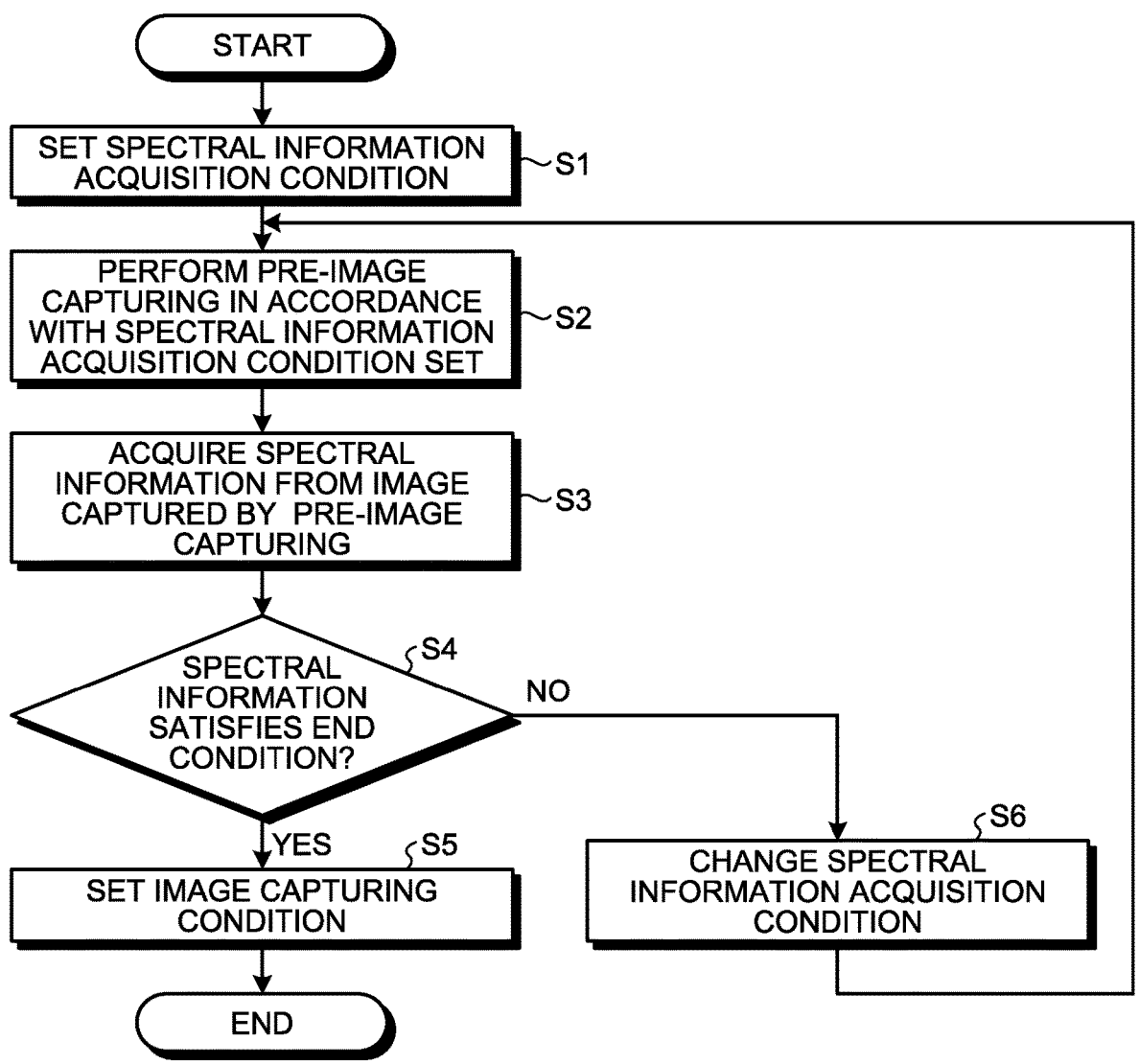
FIG. 5 is a flowchart for explaining an overview of a process performed in the image capturing device according to the first embodiment from acquiring spectral information of a subject until setting an image capturing condition.

FIG. 5 is a flowchart for explaining an overview of a process performed in the image capturing device 1 from acquiring spectral information of the subject until setting an image capturing condition. First, the condition setting section 62 sets a spectral information acquisition condition (step S1). The condition setting section 62 sets the spectral information acquisition condition in accordance with, for example, a setting instruction signal that the input unit 4 receives.

Figure 6:
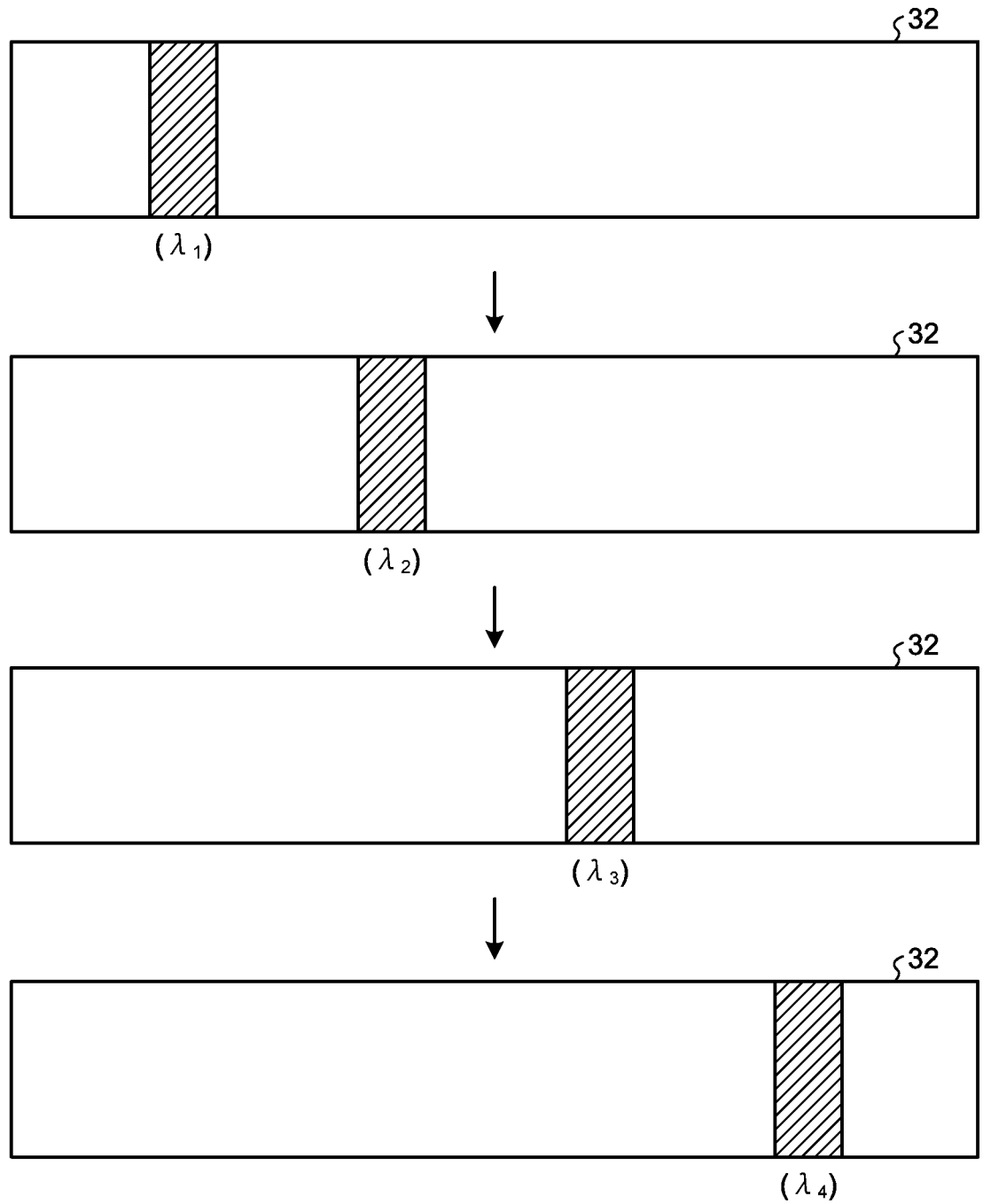
FIG. 6 illustrates an example of an operation of an illumination unit during pre-image capturing.

Subsequently, the image capturing device 1 performs pre-image capturing in accordance with the acquisition condition (step S2). Here, the image capturing controller 64 controls the operation of the imaging unit 2 by referring to the condition storage section 73. The illumination controller 65 controls the operation of the illumination unit 3 by referring to the filter information storage section 71, the position information storage section 72, and the condition storage section 73. FIG. 6 illustrates an example of the operation of the illumination unit 3 during the pre-image capturing, and schematically illustrates each of regions in the LVF 32 at which the light transmits. In a case illustrated in FIG. 6, the illumination light at four bands of transmission center wavelengths $\lambda_1$, $\lambda_2$, $\lambda_3$, and $\lambda_4$ ($\lambda_1<\lambda_2<\lambda_3<\lambda_4$) is sequentially emitted. The imaging unit 2 performs the pre-image capturing whenever the illumination unit 3 switches the illumination light.

Then, the image analysis section 61 analyzes an image signal that the imaging unit 2 has generated by the pre-image capturing so as to acquire spectral information and stores the spectral information into the spectral information storage section 75 (step S3). As has been described above, the spectral information is, for example, a statistic of pixel signal values in a region of interest (ROI) set in an image as the image signal.

Figure 7:
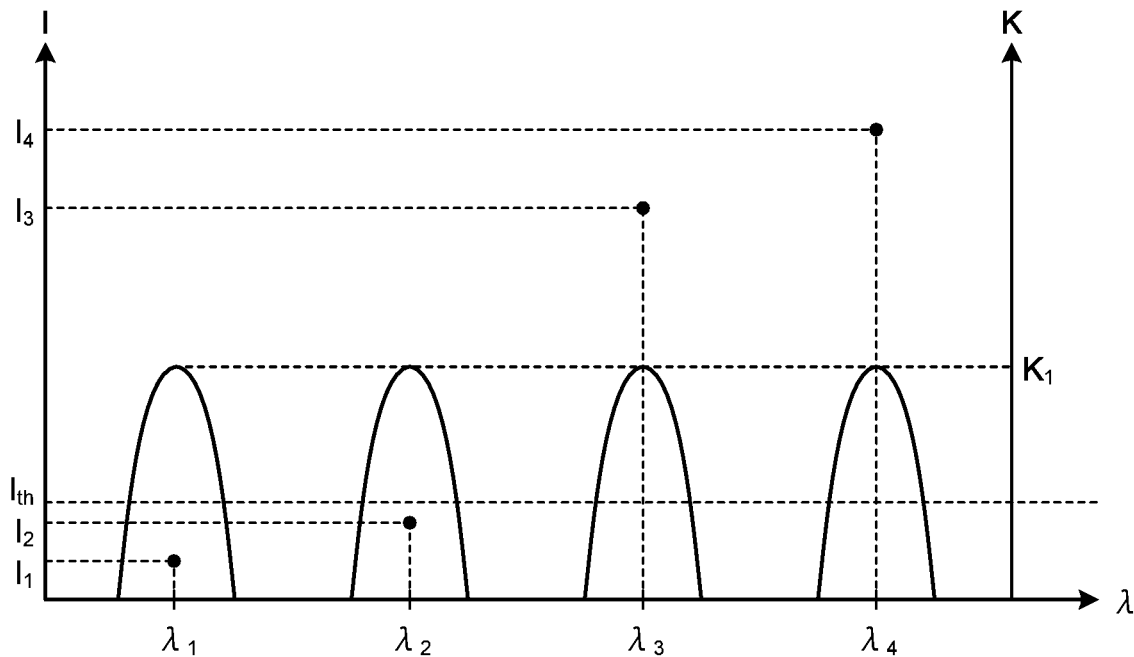
FIG. 7 illustrates a relationship between a light intensity of illumination light emitted by the illumination unit and spectral information calculated by an image analysis section based on an image signal.

FIG. 7 illustrates a relationship between a light intensity K of the illumination light emitted by the illumination unit 3 as illustrated in FIG. 6 and a spectral signal value I in the ROI as the spectral information calculated by the image analysis section 61 based on the image signal. The maximum light intensity of the illumination light at each of the four bands is equal and indicated by $K_1$. In FIG. 7, the spectral signal value under the illumination light having a transmission center wavelength of $\lambda_n$ is expressed as $I_n$. $I_{th}$ indicated in FIG. 7 is the threshold value predetermined for the end condition.

When the step S3 ends, the determination section 63 refers to the condition storage section 73 to determine whether or not the spectral information satisfies the end condition predetermined (step S4). The end condition in a case illustrated in FIG. 7 is "the spectral signal value In at each of the bands is greater than the threshold value Ith". In FIG. 7, each of spectral signal values $I_1$ and $I_2$ is below the threshold value $I_{th}$, and thus, the determination section 63 determines that the end condition is not satisfied.

When the determination section 63 determines that the spectral information satisfies the end condition (step S4: Yes), the condition setting section 62 sets and stores the image capturing condition into the condition storage section 73 (step S5). For example, the condition setting section 62 applies the pre-image capturing condition (that causes the end condition to be satisfied), such as the number of bands and the light intensity of transmission center wavelength of the illumination light emitted by the illumination unit 3, to the image capturing condition. On the other hand, with regard to a frame rate for the image capturing (in other words, length of time that the illumination unit 3 emits illumination light at each band for the image capturing), the condition setting section 62 selects a predetermined frame rate that is different from the frame rate in the pre-image capturing. With this configuration, the condition setting section 62 sets the image capturing condition by including some of the pre-image capturing conditions satisfying the end condition, so as to acquire an image that matches a spectral characteristic of the subject in the image capturing. When the step S5 ends, the image capturing device 1 completes a series of process steps.

Figure 8:
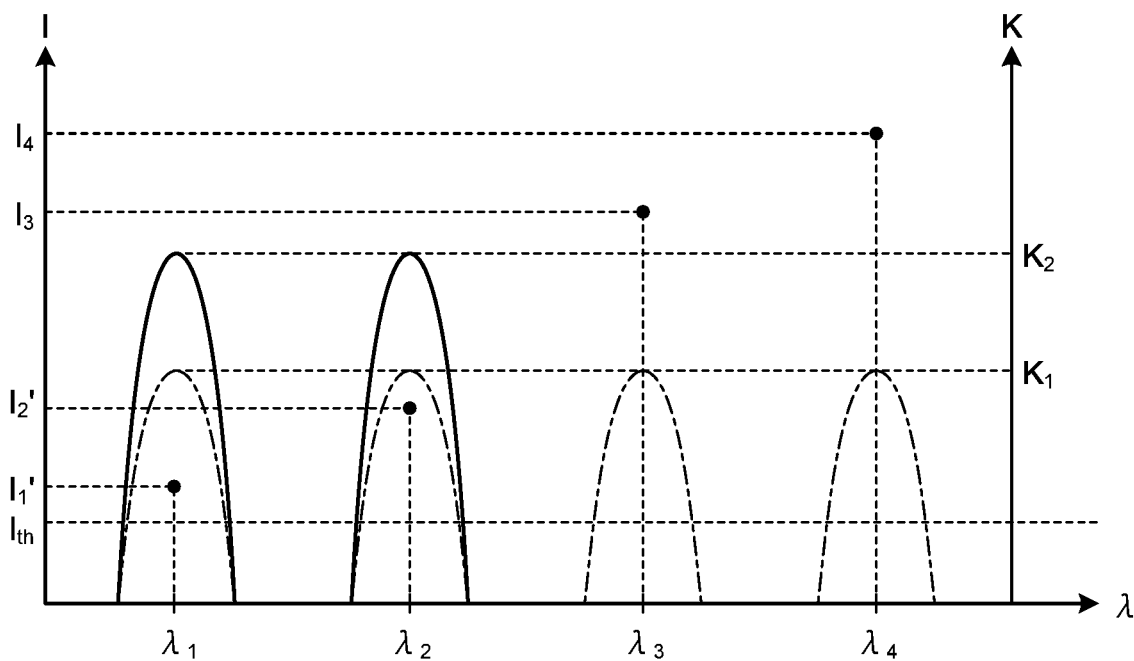
FIG. 8 illustrates an example of a change of an acquisition condition and spectral information acquired after the change of the acquisition condition.

In the step S4, when the determination section 63 determines that the spectral information does not satisfy the end condition (step S4: No), the condition setting section 62 refers to the condition storage section 73 to change the spectral information acquisition condition (step S6). FIG. 8 illustrates an example of a change of the acquisition condition and spectral signal values acquired after the change of the acquisition condition. In a case illustrated in FIG. 8, the condition setting section 62 resets a light intensity of the illumination light at the transmission center wavelengths $\lambda_1$ and $\lambda_2$ that had the spectral signal values $I_1$ and $I_2$ (each under the threshold value $I_{th}$) at $K_2$. The light intensity $K_2$ is greater than the light intensity $K_1$. The light intensity $K_2$ is a function of the light intensity $K_1$. For example, the light intensity $K_2$ is obtained by multiplying the light intensity $K_1$ by a predetermined magnification $\alpha$ (>1). In the case illustrated in FIG. 8, the condition setting section 62 changes the spectral information acquisition condition to perform pre-image capturing under illumination light at four bands, two of which each have the light intensity changed. By changing the acquisition condition as described above, it is possible to acquire accurate spectral information at a band having a relatively small spectral signal value. Thus, the change of the acquisition condition as above is preferable when information of a wavelength component having a relatively low spectral signal value is important for determining a characteristic of the subject.

Subsequently, the image capturing device 1 returns to the step S2 to acquire spectral information again. In the case illustrated in FIG. 8, two spectral signal values are acquired again as $I_1'$ and $I_2'$ by pre-image capturing under the illumination light at the transmission center wavelengths $\lambda_1$ and $\lambda_2$. Each of the spectral signal values $I_1'$ and $I_2'$ is greater than the threshold value $I_{th}$. Accordingly, in this case, the determination section 63 determines in the step S4 that the spectral information satisfies the end condition. When the determination section 63 determines that the end condition is not satisfied again, the condition setting section 62 further changes the spectral information acquisition condition and repeats the process steps from the step S2. Specifically, the condition setting section 62 acquires spectral information by multiplying the light intensity $K_2$ by the magnification $\alpha$.

When the number of change of the spectral information acquisition condition exceeds a predetermined number, the image capturing device 1 may complete the series of process steps by causing the output unit 5 to output an error message indicating that the spectral information is not acquired. Alternatively, when the number of change of the spectral information acquisition condition exceeds the predetermined number, the condition setting section 62 may set the image capturing condition based on the spectral information acquisition condition set most recently. With these measures, the number of pre-image capturing is less prone to increase.

As has been described above, in an image capturing device according to the first embodiment, when spectral information acquired by an image analysis section does not satisfy an end condition, a condition setting section changes the spectral information acquisition condition, so that an acquisition condition in accordance with a spectral characteristic of a subject is adequately set. As a result, highly accurate spectral information of the subject is acquired.

The image capturing device according to the first embodiment increases maximum light intensity of illumination light component at a wavelength band smaller than a threshold value, so as to increase sensitivity and improve signal-noise ratio at such a wavelength band. As a result, the highly accurate spectral information in accordance with the spectral characteristic of the subject is acquired.

Further, in the image capturing device according to the first embodiment, the spectral information acquisition condition is adequately set during pre-image capturing, so that a user utilizes time required for image composition or focus adjustment as a preparation for an image capturing and efficiently controls the image capturing.

First Modification

Figure 9:
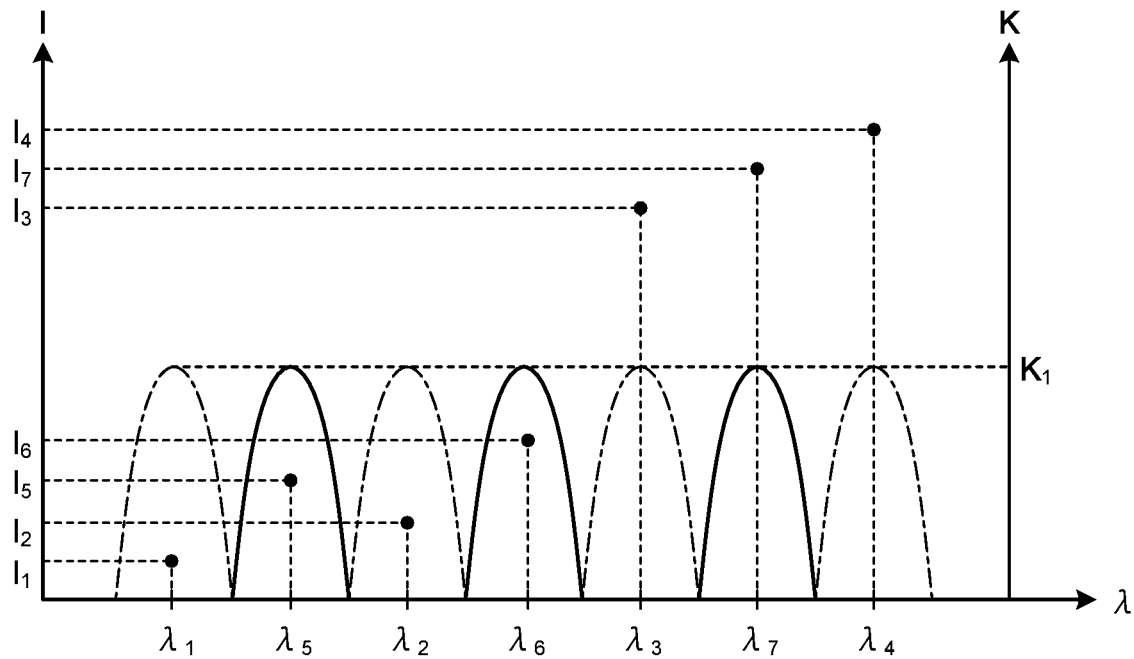
FIG. 9 is a diagram, according to a first modification of the first embodiment, illustrating an example of a change of an acquisition condition performed by a condition setting section when an end condition is not satisfied and illustrating spectral information acquired after the change of the acquisition condition.

An image capturing device according to the first modification of the first embodiment is different in its end condition and its method for changing a spectral information acquisition condition from the image capturing device according to the first embodiment. The end condition in the first modification depends on, for example, "whether or not the spectral information acquired is differentiated from spectral information previously acquired or spectral information prepared as reference". FIG. 9 illustrates an example of the change of the acquisition condition performed by the condition setting section 62 when the end condition is not satisfied, and illustrates each spectral signal value acquired after the change of the acquisition condition. In a case illustrated in FIG. 9, as the change of the acquisition condition, the condition setting section 62 sets illumination light including three bands (transmission center wavelengths $\lambda_5$, $\lambda_6$, and $\lambda_7$) to be applied, the three bands different from the bands illustrated in FIG. 7. Thus, the illumination light has seven bands together with the bands illustrated in FIG. 7. With this configuration, the illumination light has an increased number of bands, thereby improving a wavelength resolution. As a result, the image capturing device acquires more accurate spectral information. When performing pre-image capturing after the change of the acquisition condition, the image capturing device may perform the pre-image capturing only at the three bands newly included, or alternatively may perform the pre-image capturing at the seven bands including the four bands from before the change.

In FIG. 9, the three bands newly included do not overlap with any of the initial four bands, but adjacent twos of bands may overlap with each other as long as the adjacent twos of bands are different in transmission center wavelength. When the end condition is not satisfied even under the acquisition condition illustrated in FIG. 9, the image capturing device performs the pre-image capturing by further increasing the bands, each of the bands different in transmission center wavelength. In this case, for example, the image capturing device applies illumination light at new bands, each of the bands having an intermediate transmission center wavelength of its adjacent band as its own transmission center wavelength.

Note that, when changing the acquisition condition by increasing the number of bands, the end condition is not limited to the foregoing description. Additionally, a method for increasing the number of bands is not limited to the foregoing description.

Second Modification

Figure 10:
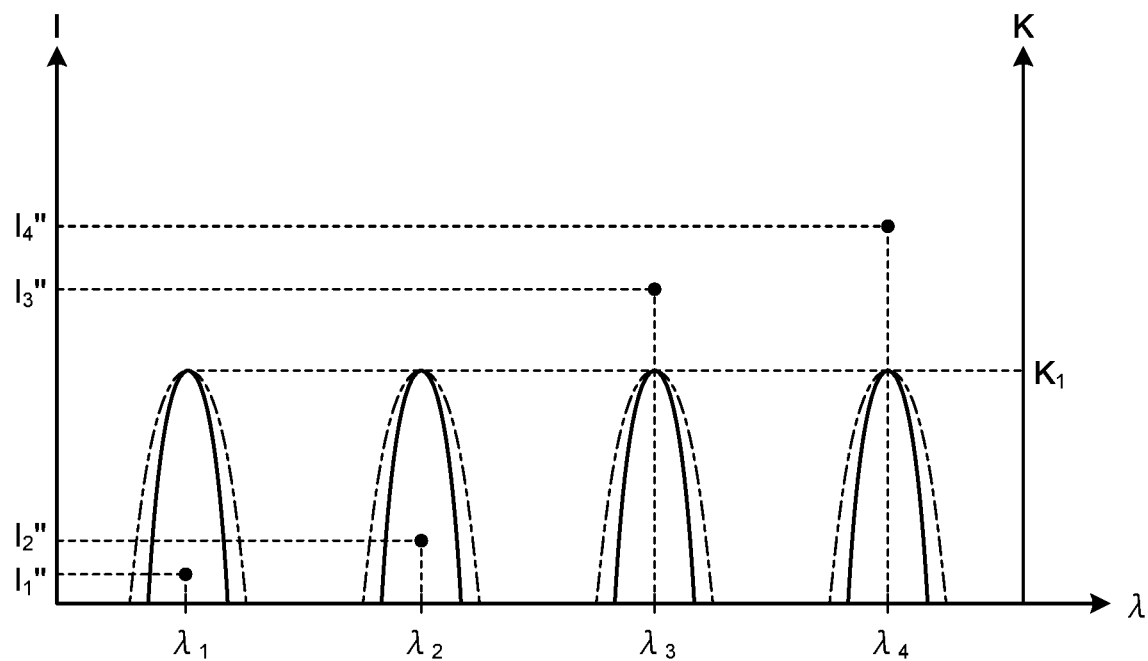
FIG. 10 is a diagram, according to a second modification of the first embodiment, illustrating an example of a change of an acquisition condition performed by the condition setting section when the end condition is not satisfied and illustrating spectral information acquired after the change of the acquisition condition.

An image capturing device according to the second modification of the first embodiment is different in its end condition and its method for changing a spectral information acquisition condition from the image capturing device according to the first embodiment and the image capturing device according to the first modification of the first embodiment. The end condition in the second modification is, for example, that "the spectral signal value has a gap between its maximum and its minimum within a predetermined value". FIG. 10 illustrates an example of the change of the acquisition condition performed by the condition setting section 62 when the end condition is not satisfied, and a spectral signal value acquired after the change of the acquisition condition. In a case illustrated in FIG. 10, the condition setting section 62 changes the acquisition condition by reducing a half width of each of bands in accordance with a predetermined rule. In order to reduce the half width of each of the bands, each of the regions in the liquid crystal section 33, at which the light transmitted through the LVF 32 transmits, may preferably be reduced. The predetermined rule is indicated by, for example, a function of the half width before the change.

By reducing the half width of each of the bands without changing any other items in the acquisition condition, the spectral information is typically reduced in size compared with before the change. As a result, the spectral signal value is less prone to reach a saturation value. Further, for example, when the gap between the maximum and the minimum in spectral information at each of the bands is important for determining a characteristic of the subject, the reduction in half width improves the determination accuracy.

Note that, when changing the acquisition condition by reduction in half width of each of the bands, the end condition is not limited to the foregoing description.

Other Modification

For example, when information on a band having a relatively large spectral signal value is important, an end condition may preferably be set in order to accurately acquire the information on such a band, and based on the end condition, a method for changing a spectral information acquisition condition may preferably be set. For example, in the case illustrated in FIG. 7, when information on the bands of the transmission center wavelengths $\lambda_3$ and $\lambda_4$ is important, the spectral information may be acquired again under illumination light at these bands, each having an increased light intensity. Alternatively, the spectral information may be acquired again under illumination light at increased number of bands in a vicinity of the transmission center wavelengths $\lambda_3$ and $\lambda_4$. Still alternatively, the spectral information may be acquired again under illumination light at the transmission center wavelengths $\lambda_3$ and $\lambda_4$, each having an increased half width. In these cases too, the change of the acquisition condition improves the wavelength resolution, so that the image capturing device acquires a spectral characteristic of the subject at higher accuracy.

Second Embodiment

An image capturing device according to the second embodiment performs pre-image capturing to obtain two images by shifting a wavelength of each band of illumination light in a predetermined amount. Based on the pre-image capturing, the image capturing device obtains two spectral signal values as spectral information, each value indicated on a curved line, and determines a degree of similarity between the two curved lines. When the degree of similarity is within a predetermined range, the image capturing device ends the pre-image capturing. In other words, an end condition in the second embodiment is that "when two spectral signal values acquired based on the two images at two different bands are respectively indicated by curved lines, the degree of similarity between the curved lines is within the predetermined range". When the end condition is not satisfied, the image capturing device applies illumination light at increased bands, each band having a half width reduced, and performs pre-image capturing to acquire two images again. Then, the image capturing device determines on a degree of similarity between the two curved lines obtained based on the two images. The image capturing device repeats these process steps until the degree of similarity between the two curved lines is within the predetermined range.

The image capturing device according to the second embodiment is configured as described in the image capturing device 1 according to the first embodiment (see FIG. 1). Additionally, an overview of a process performed in the image capturing device according to the second embodiment, from setting a spectral information acquisition condition until setting an image capturing condition, is similar to the overview of the process performed in the image capturing device 1 according to the first embodiment (see FIG. 5).

Figure 11A:
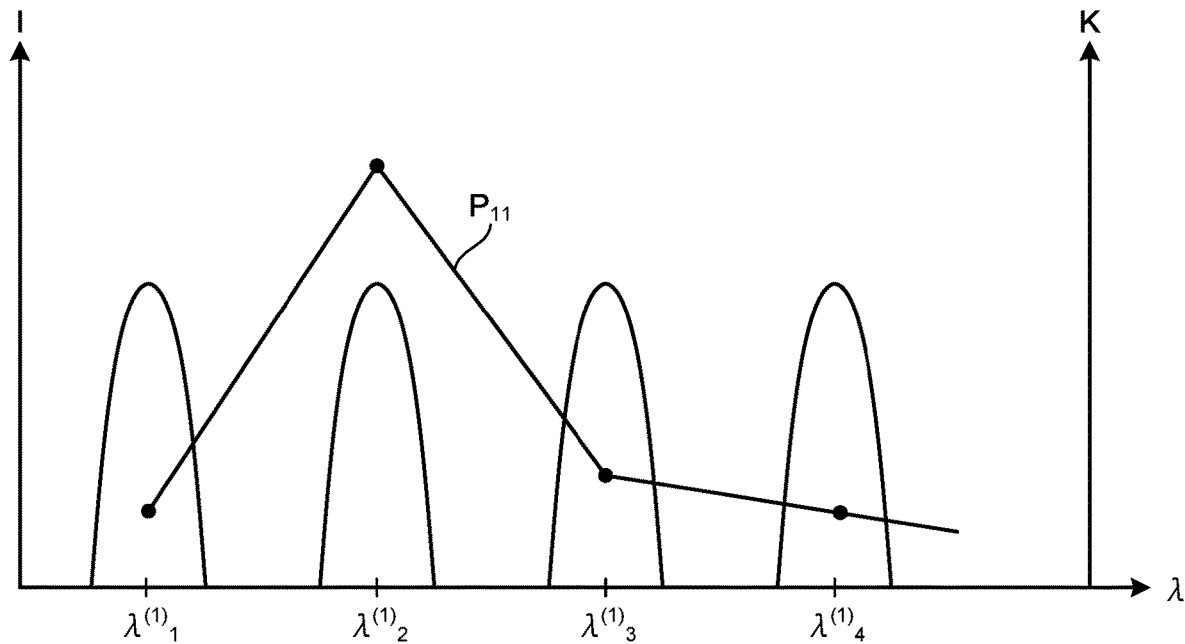
FIG. 11A is a diagram (1) illustrating a relationship between spectral information and a transmission center wavelength when an image capturing device according to a second embodiment performs pre-image capturing twice by applying illumination light including components at four bands, each band equal to the other in light intensity and half width of the transmission center wavelength as an initial state.
Figure 11B:
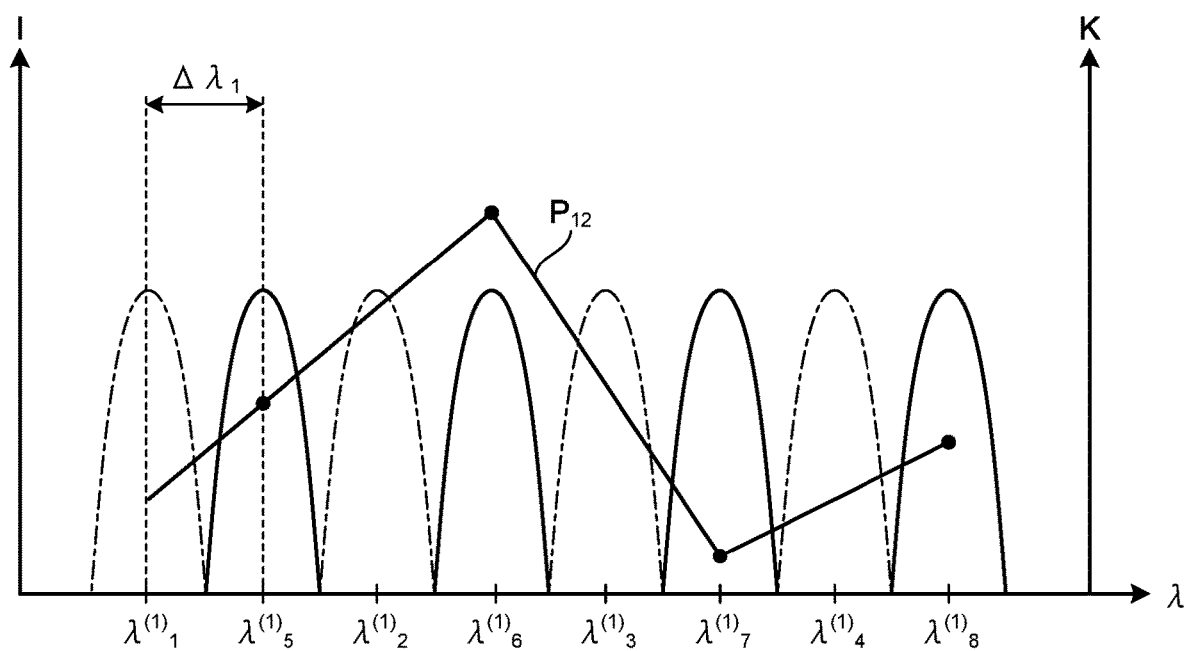
FIG. 11B is a diagram (2) illustrating a relationship between spectral information and a transmission center wavelength when the image capturing device according to the second embodiment performs the pre-image capturing twice by applying the illumination light including the components at four bands, each band equal to the other in light intensity and half width of the transmission center wavelength as the initial state.

Each of FIGS. 11A and 11B illustrates a relationship between a spectral signal value and a transmission center wavelength when the pre-image capturing is performed twice under illumination light including components at four bands, each band equal to the other in light intensity and half width of the transmission center wavelength as an initial state. FIG. 11A illustrates the relationship between the spectral information and the transmission center wavelengths when the light at four bands, each band having a corresponding one of four wavelengths $\lambda^{(1)}_n$ (n=1 to 4) as its transmission center wavelength, is sequentially applied. In FIG. 11A, a polygonal line $P_{11}$ obtained by connecting spectral information adjoining each other on a straight line corresponds to a curved line used for determination on the degree of similarity. FIG. 11B illustrates the relationship between the spectral signal value and the transmission center wavelength when the light at four bands, each band having a corresponding one of four wavelengths $\lambda^{(1)}_{n+4}$ (n=1 to 4) as its transmission center wavelength, is sequentially applied. In FIG. 11B, as similarly to FIG. 11A, a polygonal line $P_{12}$ obtained by connecting spectral information adjacent to each other on a straight line corresponds to a curved line used for determination on the degree of similarity. The wavelength $\lambda^{(1)}_{n+4}$ is a wavelength obtained by increasing $\lambda^{(1)}_n$ by a predetermined amount of $\Delta\lambda 1$. In a case illustrated in FIG. 11B, $\Delta\lambda 1$ is an equal amount between each of all $\lambda^{(1)}_n$ and $\Delta\lambda_1 = (\lambda^{(1)}_2 - \lambda^{(1)}_1)/2$.

The determination section 63 determines on the degree of similarity between the polygonal line $P_{11}$ and the polygonal line $P_{12}$ as the step S4 of the flowchart illustrated in FIG. 5. When determining on the degree of similarity, the determination section 63 determines based on any one of conventionally known various methods. These methods include, for example, a similarity evaluation method using a correlation coefficient or an image pattern matching method.

Figure 12A:
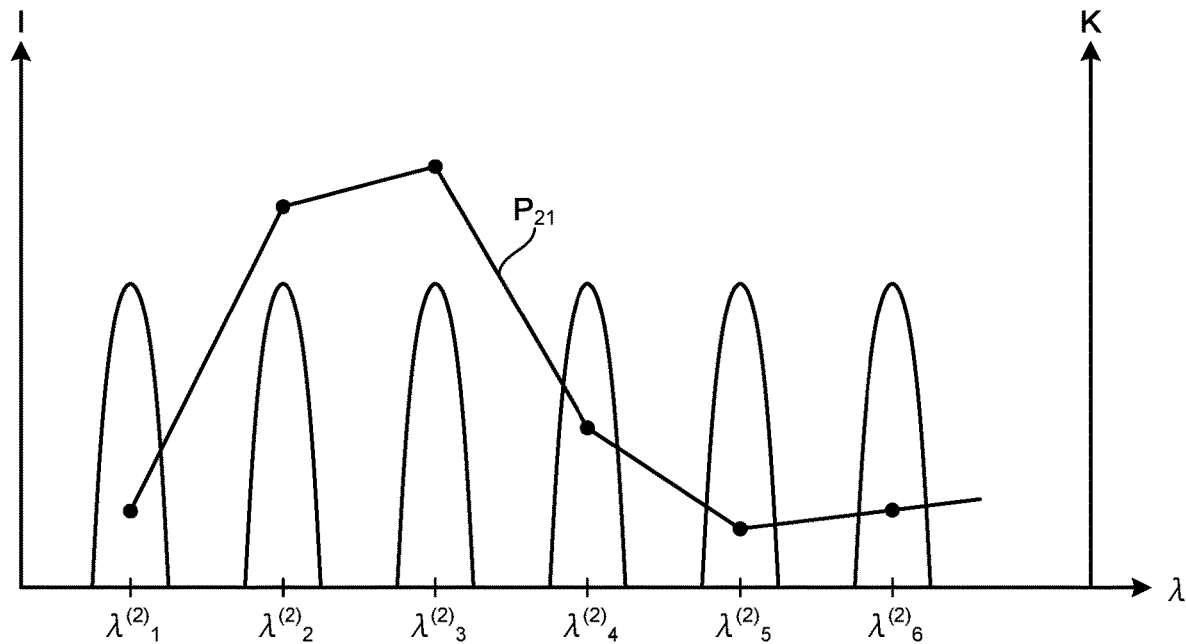
FIG. 12A is a diagram (1), in the image capturing device according to the second embodiment, illustrating an acquisition condition changed by a condition setting section when a determination section determines that spectral information does not satisfy an end condition and illustrating spectral information acquired in accordance with the acquisition condition changed by the condition setting section.
Figure 12B:
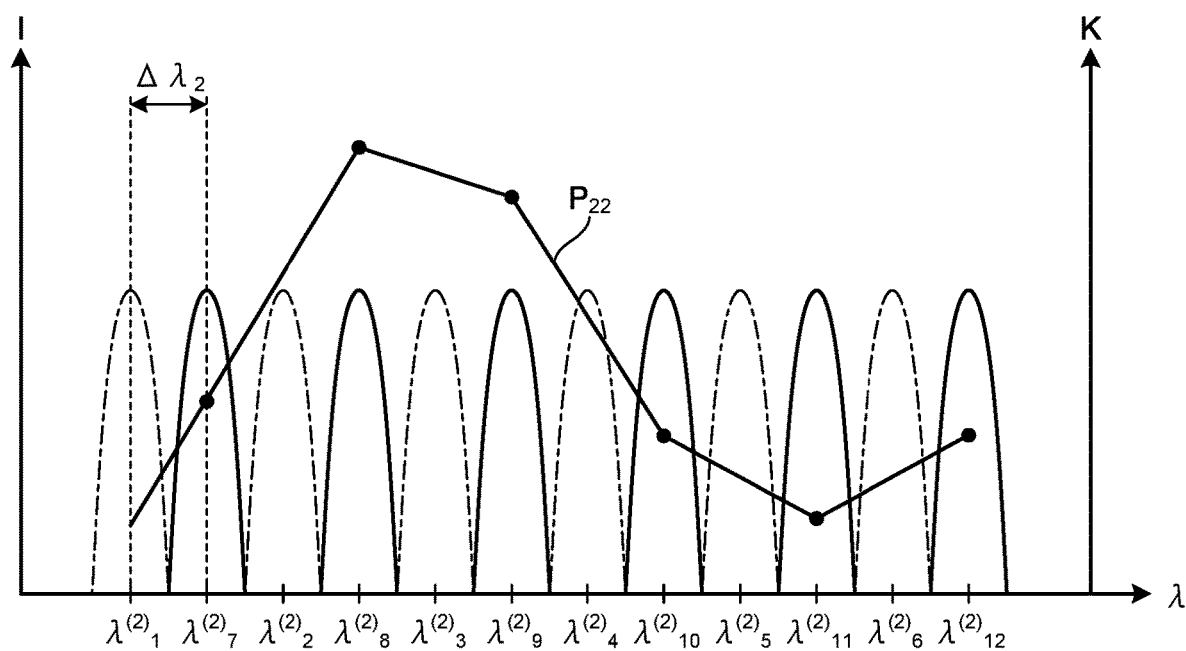
FIG. 12B is a diagram (2), in the image capturing device according to the second embodiment, illustrating an acquisition condition changed by the condition setting section when the determination section determines that the spectral information does not satisfy the end condition and illustrating spectral information acquired in accordance with the acquisition condition changed by the condition setting section.

Each of FIGS. 12A and 12B illustrates an acquisition condition changed by the condition setting section 62 when the determination section 63 determines that the degree of similarity between the polygonal line $P_{11}$ and the polygonal line $P_{12}$ is not within the predetermined range, in other words, the spectral information does not satisfy the end condition in the step S4 of the flowchart in FIG. 5. Each of FIGS. 12A and 12B illustrates a spectral signal value obtained in the pre-image capturing in accordance with the acquisition condition changed by the condition setting section 62. FIG. 12A illustrates the relationship between the spectral signal value and the transmission center wavelength when the light at six bands, each band having a corresponding one of six wavelengths $\lambda^{(2)}_n$ (n=1 to 6) as its transmission center wavelength and being equal to the other in light intensity and half width of the transmission center wavelength, is sequentially applied. In FIG. 12A, a polygonal line $P_{21}$ is obtained by connecting the spectral information adjoining each other on a straight line. FIG. 12B illustrates the relationship between the spectral signal value and the transmission center wavelength when the light at six bands, each band having a corresponding one of six wavelengths $\lambda^{(2)}_{n+6}$ (n=1 to 6) as its transmission center wavelength, is sequentially applied. In FIG. 12B, as similarly to the polygonal line $P_{21}$, a polygonal line $P_{22}$ is obtained by connecting the spectral information adjacent to each other on a straight line. The wavelength $\lambda^{(2)}_{n+6}$ is a wavelength obtained by increasing $\lambda$ (2) n by a predetermined amount of $\Delta\lambda_2$. The predetermined amount of $\Delta\lambda_2=(\lambda^{(2)}_2-\lambda^{(2)}_1)/2$. Each of the bands illustrated in FIGS. 12A and 12 is equal in half width, and is smaller in half width than each of the bands illustrated in FIGS. 11A and 11B.

The determination section 63 determines on the degree of similarity between the polygonal line $P_{21}$ and the polygonal line $P_{22}$ as the step S4 of the flowchart in FIG. 5. When the determination section 63 determines that the degree of similarity satisfies the predetermined criterion (step S4: Yes), the image capturing device moves to set the image capturing condition. On the other hand, when the determination section 63 determines that the degree of similarity does not satisfy the predetermined criterion (step S4: No), the condition setting section 62 changes the acquisition condition again. The case in which the determination section 63 determines that the degree of similarity between the polygonal line $P_{21}$ and the polygonal line $P_{22}$ does not satisfy the end condition will be described below.

Figure 13A:
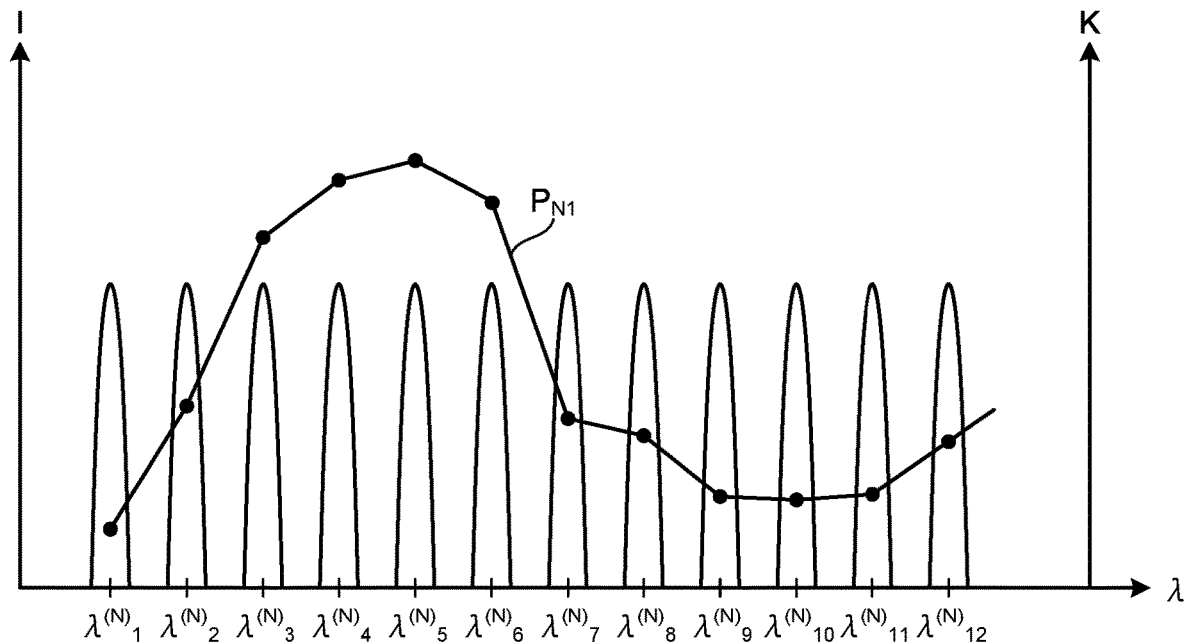
FIG. 13A is a diagram (1), in the image capturing device according to the second embodiment, illustrating an acquisition condition finally set by the condition setting section and spectral information acquired in accordance with the acquisition condition finally set by the condition setting section, with which the determination section determines that the spectral information satisfies the end condition.
Figure 13B:
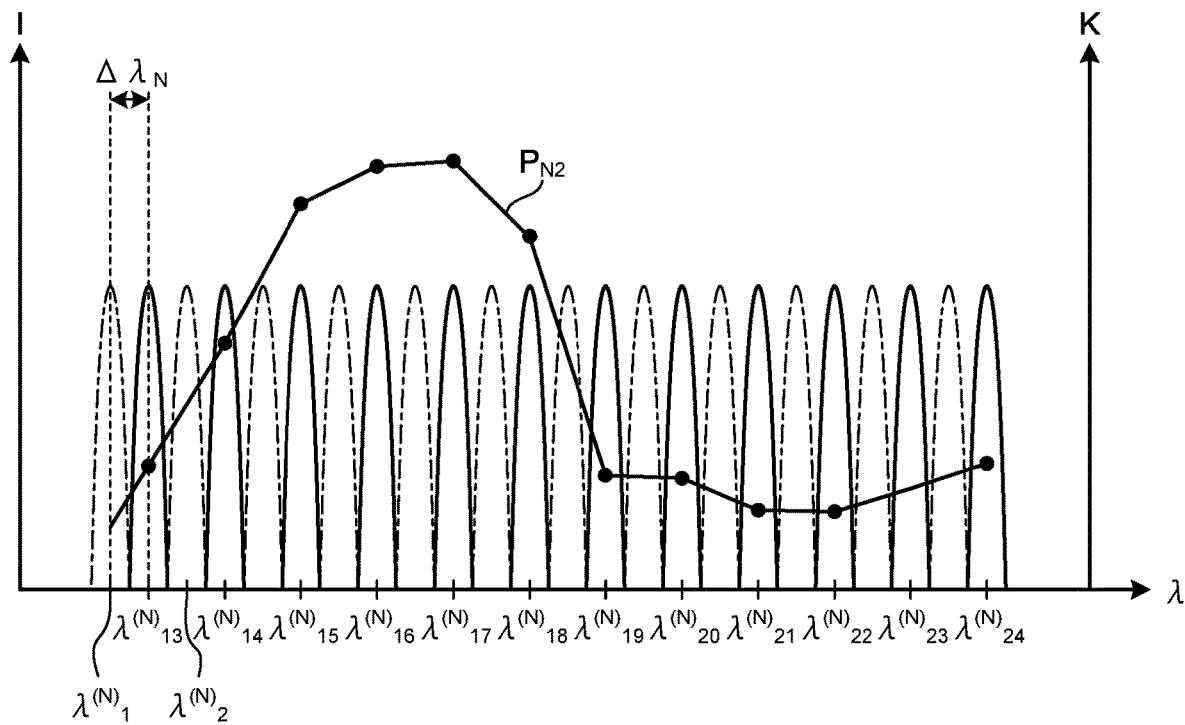
FIG. 13B is a diagram (2), in the image capturing device according to the second embodiment, illustrating an acquisition condition finally set by the condition setting section and spectral information acquired in accordance with the acquisition condition finally set by the condition setting section, with which the determination section determines that the spectral information satisfies the end condition.

Each of FIGS. 13A and 13B illustrates an acquisition condition finally set by the condition setting section 62 as a result of the repeated process steps above, and a spectral signal value acquired in pre-image capturing in accordance with the acquisition condition. With the acquisition condition and the spectral signal value, the determination section 63 eventually determines that the spectral information satisfies the end condition. FIG. 13A illustrates the relationship between the spectral signal value and the transmission center wavelength when the light at twelve bands, each band having a corresponding one of twelve wavelengths $\lambda^{(N)}_n$ (n=1 to 12) as its transmission center wavelength and being equal to the other in light intensity and half width of the transmission center wavelength, is sequentially applied. A polygonal line $P_{N1}$ is obtained by connecting the spectral information adjoining each other on a straight line. FIG. 13B illustrates the relationship between the spectral signal value and the transmission center wavelength when the light at twelve bands, each band having a corresponding one of twelve wavelengths $\lambda^{(N)}_{n+12}$ (n=1 to 12) as its transmission center wavelength, is sequentially applied. A polygonal line $P_{N2}$ is obtained by connecting the spectral information adjacent to each other on a straight line. The wavelength $\lambda^{(N)}_{n+12}$ is a wavelength obtained by increasing $\lambda^{(N)}_n$ by a predetermined amount of $\Delta\lambda_N$. The predetermined amount $\Delta\lambda_N=(\lambda^{(N)}_2-\lambda^{(N)}_1)/2$.

As has been described above, an image capturing device according to the second embodiment acquires highly accurate spectral information of a subject under an adequate acquisition condition, as with the first embodiment.

The image capturing device according to the second embodiment performs pre-image capturing to obtain two images by shifting a transmission center wavelength of each band of illumination light in a predetermined amount, and based on the two images, two curved lines, each indicating a spectral signal value is acquired. Then, the image capturing device determines on a degree of similarity between the two curved lines, and changes a spectral information acquisition condition to improve wavelength resolution until the degree of similarity falls within a predetermined range. Accordingly, the image capturing device acquires the highly accurate spectral information in accordance with the spectral characteristic of the subject.

The method for changing the spectral information acquisition condition described in the second embodiment is preferable, for example, when a wideband spectral information profile is important for determining a characteristic of the subject.

In the second embodiment, each of the curved lines used for determining on the degree of similarity is expressed by the polygonal line as described above. Instead of the polygonal line, a curved line running through all spectral information (polynomial expression) may alternatively be used by referring to a least squares method or the like.

Additionally, when changing the acquisition condition in the second embodiment, the image capturing device may change the illumination light by increasing the number of bands without changing the half width of each of the bands, or by changing the light intensity of the transmission center wavelength together with the number of bands.

Further, in the second embodiment, the wavelength may be divided into a plurality of segments, and the determination section 63 may determine on a degree of similarity in curved line between each of the segments. In this case, the condition setting section 62 may change the acquisition condition such that the half width of the wavelength is reduced only in the segment where the degree of similarity is determined not within the predetermined range (i.e., non-similar segment only).

Third Embodiment

An image capturing device according to the third embodiment calculates a maximum inclination of a curved line that indicates a relationship between a wavelength of illumination light and a spectral signal value based on an image captured. Then, until the inclination of the curved line becomes larger than a predetermined inclination, the image capturing device increases the number of bands of the illumination light by reducing a half width of each of the bands. The image capturing device according to the third embodiment is configured as described in the image capturing device 1 according to the first embodiment (see FIG. 1). Additionally, an overview of a process performed in the image capturing device according to the second embodiment, from setting a spectral information acquisition condition until setting an image capturing condition, is similar to the overview of the process performed in the image capturing device 1 according to the first embodiment (see FIG. 5).

Figure 14A:
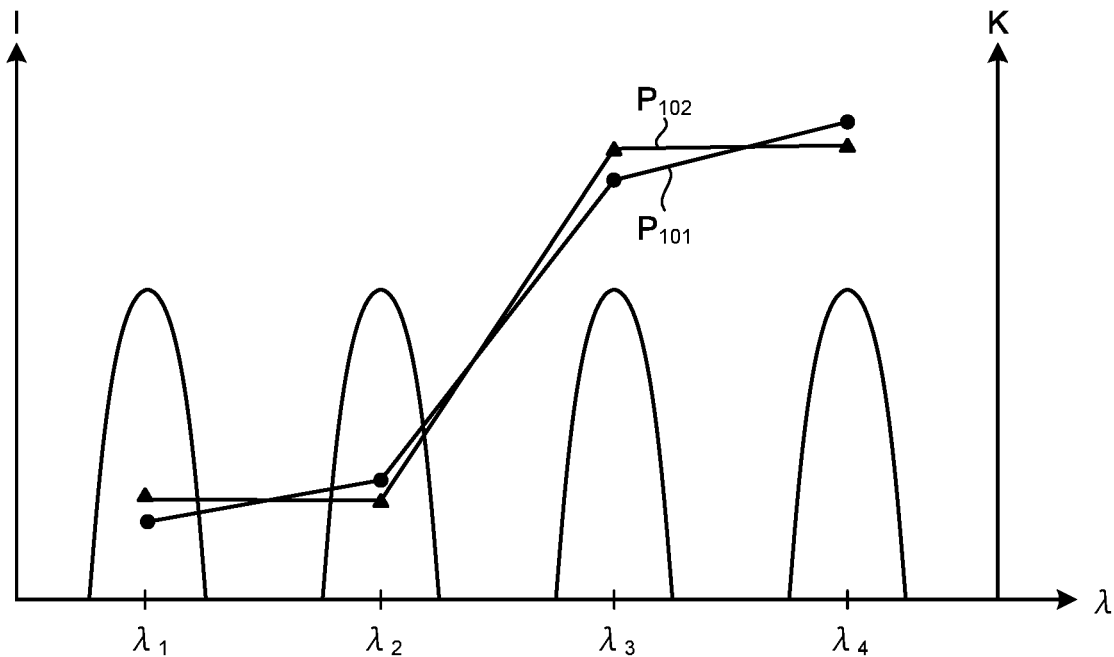
FIG. 14A illustrates a relationship between spectral information of two subjects and a transmission center wavelength when an image capturing device according to a third embodiment captures an image by irradiating each of the two subjects with illumination light including components at four bands, each band equal to the other in light intensity and half width of the transmission center wavelength.

FIG. 14A illustrates a relationship between spectral signal values of two subjects and a transmission center wavelength when the image capturing device performs pre-image capturing by irradiating each of the two subjects with illumination light including components at four bands, each band equal to the other in light intensity and half width of the transmission center wavelength. In FIG. 14A, each of polygonal lines $P_{101}$ and $P_{102}$ has a large gap in spectral information between transmission center wavelengths $\lambda_2$ and $\lambda_3$, and thus has the maximum inclination between the transmission center wavelengths $\lambda 2$ and $\lambda 3$. In this case, an end condition is, for example, that "when each spectral signal value adjoins the other in the wavelength direction, a maximum variation rate of the spectral signal value to the wavelength (the maximum inclination) is above a predetermined value".

When each of the polygonal lines $P_{101}$ and $P_{102}$ does not satisfy the end condition described above (step S4: No in FIG. 5), the condition setting section 62 changes the spectral information acquisition condition (step S6 in FIG. 5). Specifically, the condition setting section 62 sets a segment including the transmission center wavelengths $\lambda_2$ and $\lambda_3$ as the wavelength band where each of the polygonal lines $P_{101}$ and $P_{102}$ has the maximum inclination, and increases the number of bands in the segment to six (i.e., transmission center wavelengths $\lambda_5$ to $\lambda_{10}$) to reduce a half width of each of the bands.

Figure 14B:
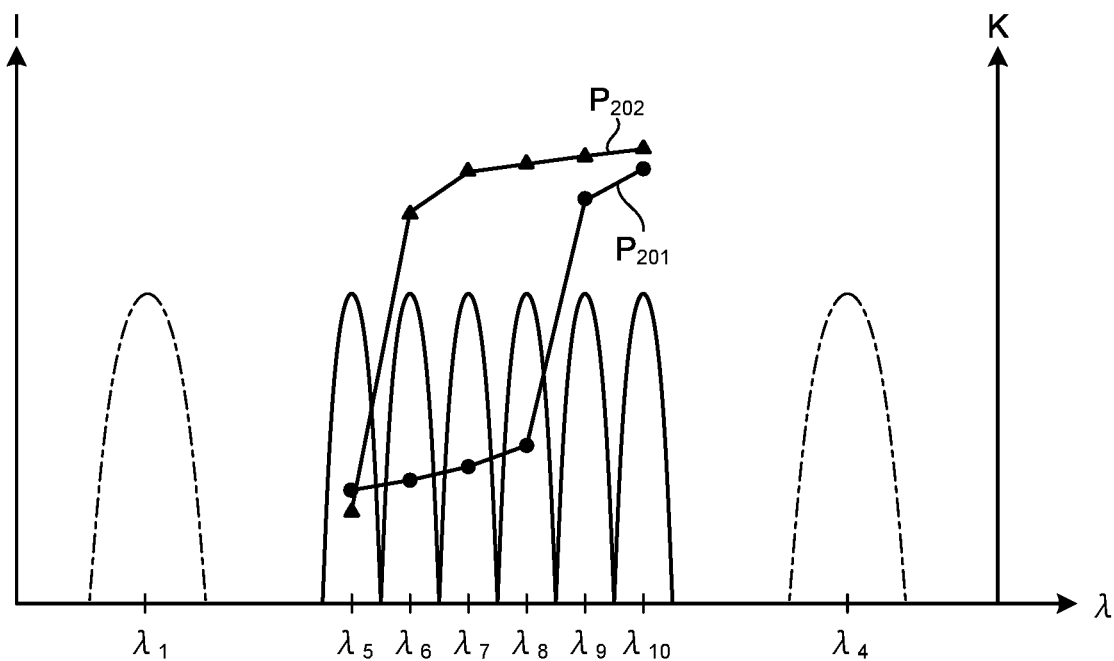
FIG. 14B illustrates, in the image capturing device according to the third embodiment, a relationship between spectral information of the two subjects and a transmission center wavelength acquired after a condition setting section changes the acquisition condition.

FIG. 14B illustrates a relationship between spectral signal values of the two subjects and a transmission center wavelength when performing pre-image capturing on each of the two subjects in accordance with the acquisition condition changed by the condition setting section 62. Polygonal lines $P_{201}$ and $P_{202}$ illustrated in FIG. 14B respectively correspond to the polygonal lines $P_{in}$ and $P_{102}$. Each of the wavelengths $\lambda_5$ to $\lambda_{10}$ indicates a transmission center wavelength of each band in accordance with the acquisition condition changed. In FIG. 14B, a half width of each of the bands is substantially half of the half width of the corresponding band in FIG. 14A. The half width of each of the bands after the change is typically indicated by a function having a smaller value than the half width of the corresponding band before the change.

In FIG. 14B, the maximum inclination of the polygonal line $P_{202}$ is an inclination between the transmission center wavelength $\lambda_5$ and the transmission center wavelength $\lambda_6$. The maximum inclination of the polygonal line $P_{201}$ is an inclination between the transmission center wavelength $\lambda_8$ and the transmission center wavelength $\lambda_9$. These maximum inclinations are respectively larger than the maximum inclinations of the polygonal lines $P_{101}$ and $P_{102}$ illustrated in FIG. 14A. When the determination section 63 determines that each of the maximum inclinations of the polygonal lines $P_{201}$ and $P_{202}$ satisfies the end condition, the image capturing device 1 sets the image capturing condition for each of the two subjects.

In a case illustrated in FIG. 14B, each of the two polygonal lines $P_{201}$ and $P_{202}$ is clearly identifiable as different from the other. With this configuration, the spectral information of the two subjects, while not being differentiated in FIG. 14A, is clearly differentiated in FIG. 14B.

As has been described above, an image capturing device according to the third embodiment acquires highly accurate spectral information of a subject under an adequate acquisition condition, as with the first embodiment.

The image capturing device according to the third embodiment improves a wavelength resolution in an area where a spectral signal value largely varies with respect to a change in the wavelength so as to analyze the spectral information at higher accuracy.

The image capturing device according to the third embodiment is preferably used when a variation rate of the spectral information to the wavelength and the wavelength band in correspondence to the variation rate are important for determining a spectral characteristic of the subject.

Note that in the third embodiment, when the number of bands of illumination light is increased at reduced half width of each of the bands, the end condition may alternatively be that an increase rate in maximum inclination before and after the finely divided segments of wavelength is within a predetermined value.

Fourth Embodiment

An end condition in the fourth embodiment is, for example, that "a spectral signal value at each of bands does not saturate". In the fourth embodiment, as an acquisition condition set again based on pre-image capturing result, an image capturing device reduces a maximum light intensity at a wavelength band where the spectral signal value saturates so as to perform pre-image capturing at lower sensitivity. When the spectral signal value still saturates, the image capturing device reduces a half width of the wavelength band, while maintaining the maximum light intensity, so as to perform pre-image capturing at further lower sensitivity.

The image capturing device according to the fourth embodiment is configured as described in the image capturing device 1 according to the first embodiment (see FIG. 1). Additionally, an overview of a process performed in the image capturing device according to the second embodiment, from setting a spectral information acquisition condition until setting an image capturing condition, is similar to the overview of the process performed in the image capturing device 1 according to the first embodiment (see FIG. 5).

Figure 15A:
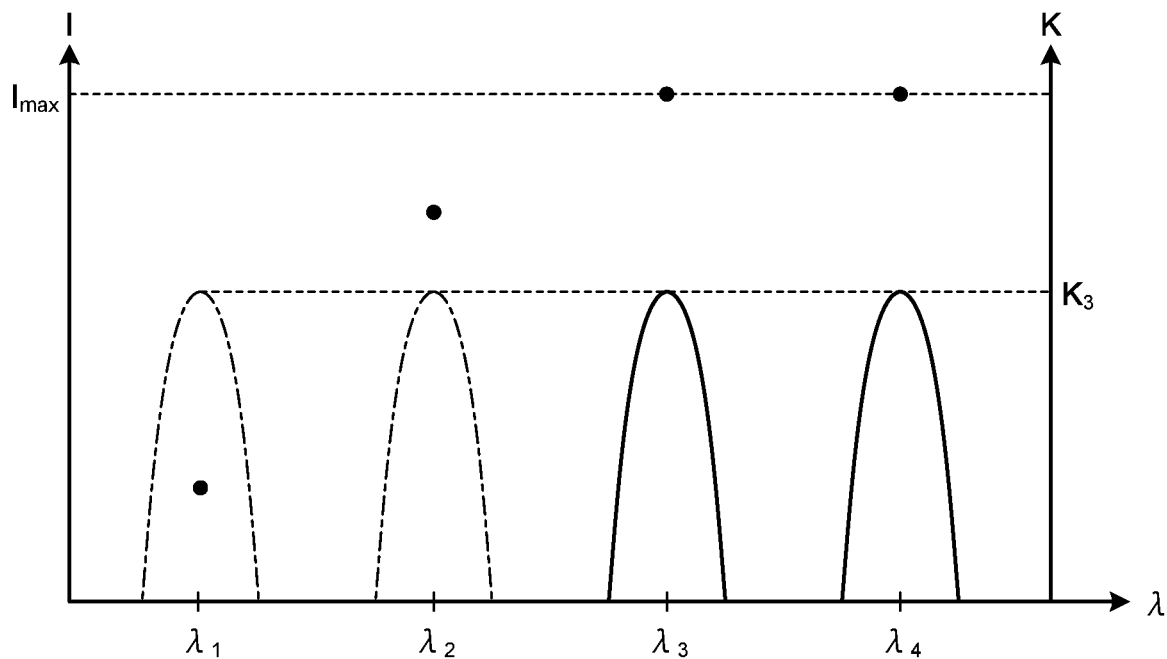
FIG. 15A illustrates a relationship between spectral information and a transmission center wavelength that an image capturing device according to a fourth embodiment acquires by applying illumination light including components at four bands, each band equal to the other in light intensity and half width of the transmission center wavelength.

FIG. 15A illustrates a relationship between a spectral signal value and a transmission center wavelength when pre-image capturing is performed under illumination light including components at four bands, each band equal to the other in light intensity and half width of the transmission center wavelength. FIG. 15A illustrates a state in which the spectral signal value acquired by the pre-image capturing reaches a saturation value $I_{max}$ at two bands (transmission center wavelengths $\lambda_3$ and $\lambda_4$). Accordingly, in this case, the determination section 63 determines that the end condition described above is not satisfied (step S4: No in FIG. 5).

Figure 15B:
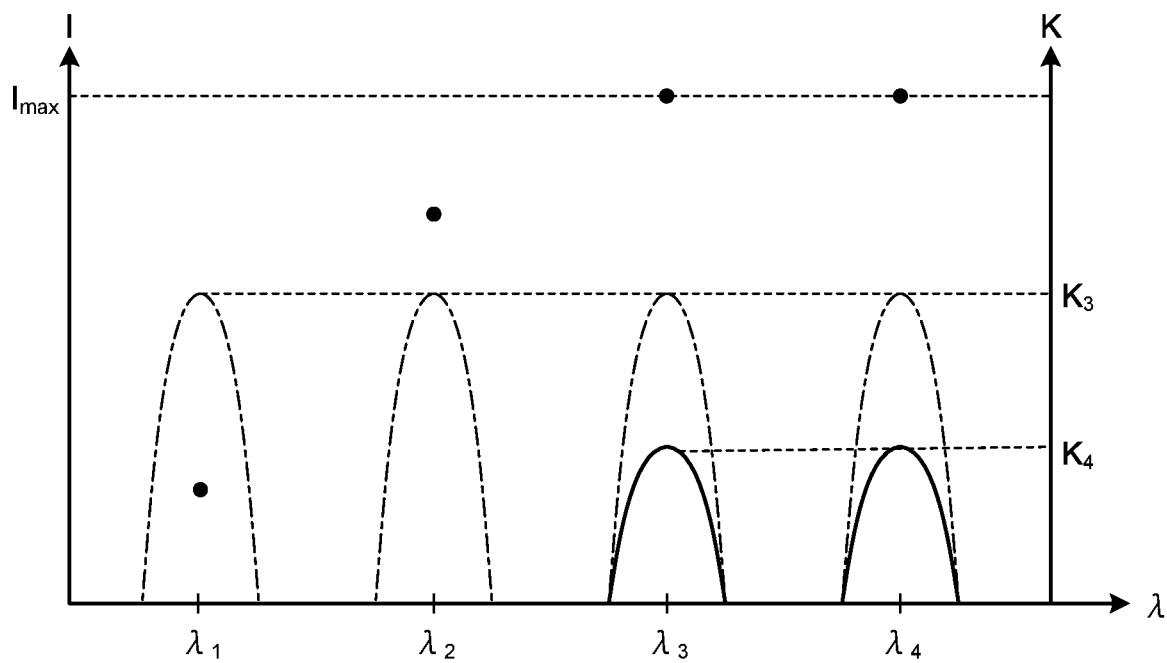
FIG. 15B illustrates a relationship between spectral information and a transmission center wavelength that the image capturing device according to the fourth embodiment acquires by applying illumination light at four bands, two of which indicated spectral information reaching a saturation value and are thus reduced in maximum light intensity.

Then, the condition setting section 62 reduces the maximum light intensity at each of the two bands (transmission center wavelengths $\lambda_3$ and $\lambda_4$) where the spectral signal value reaches the saturation value in accordance with a predetermined rule (step S6 in FIG. 5). The predetermined rule is indicated by, for example, a function of the maximum light intensity before the change. FIG. 15B illustrates a relationship between a spectral signal value and a transmission center wavelength when pre-image capturing is performed again under illumination light at four bands, two of which each indicated the spectral signal value reaching the saturation value $I_{max}$ and are thus reduced in maximum light intensity from $K_3$ to $K_4$. In a case illustrated in FIG. 15B, the spectral signal value acquired by the pre-image capturing under the illumination light still reaches the saturation value $I_{max}$ at each of the transmission center wavelengths $\lambda_3$ and $\lambda_4$. Accordingly, the determination section 63 determines that the end condition described above is not satisfied.

Figure 15C:
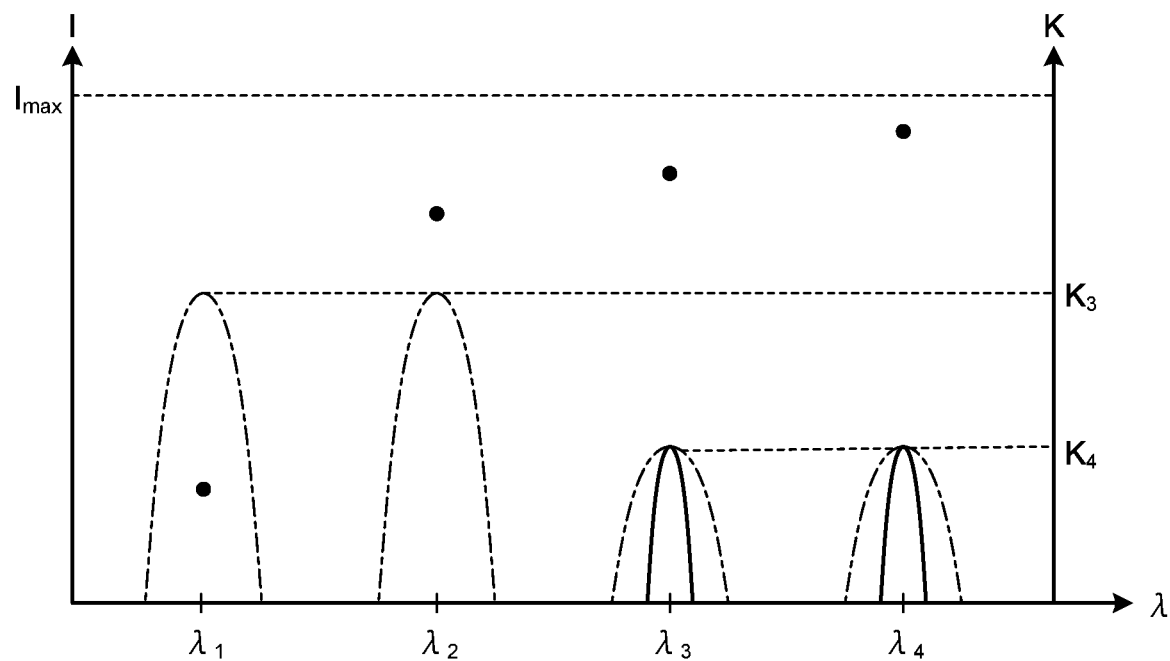
FIG. 15C illustrates a relationship between spectral information and a transmission center wavelength that the image capturing device according to the fourth embodiment acquires by applying illumination light at four bands, two of which are reduced in half width of the transmission center wavelength.

Subsequently, the condition setting section 62 reduces the half width at each of the two bands (transmission center wavelengths $\lambda_3$ and $\lambda_4$) in accordance with a predetermined rule. The predetermined rule is indicated by, for example, a function of the half width before the change. FIG. 15C illustrates a relationship between a spectral signal value and a transmission center wavelength when pre-image capturing is performed again under illumination light at four bands, two of which, i.e., the transmission center wavelengths $\lambda_3$ and $\lambda_4$, are maintained in maximum light intensity $K_4$ and reduced in half width. In a case illustrated in FIG. 15C, each of the spectral signal values at the transmission center wavelengths $\lambda_3$ and $\lambda_4$ is below the saturation value $I_{max}$. Accordingly, the determination section 63 determines that the end condition described above is eventually satisfied in the state illustrated in FIG. 15C.

As has been described above, an image capturing device according to the fourth embodiment acquires highly accurate spectral information of a subject under an adequate acquisition condition, as with the first embodiment.

The image capturing device according to the fourth embodiment adjusts sensitivity by alternately changing a light intensity and a half width, so as to adjust a spectral signal value saturating to an adequate signal level. With this configuration, the image capturing device determines the spectral characteristic further accurately.

Note that in the fourth embodiment, when performing a change of acquisition condition, the condition setting section 62 may reduce a half width of the transmission center wavelength at a band at issue, after having reduced a maximum light intensity of the transmission center wavelength repeatedly a predetermined number of times but a spectral signal value at the band still does not go below the saturation value $I_{max}$. Alternatively, the condition setting section 62 may alternately repeat each process above as the change of acquisition condition, i.e., reducing the maximum light intensity of transmission center wavelength at the band and reducing the half width of the transmission center wavelength at the band.

Still alternatively, in the fourth embodiment, when changing the acquisition condition a plurality of times, the condition setting section 62 may consecutively perform only one of the processes, i.e., reducing the maximum light intensity of the transmission center wavelength at the band or reducing the half width of the transmission center wavelength at the band.

Fifth Embodiment

In an image capturing device according to the fifth embodiment, an imaging unit includes an imaging element having an image sensor with a color filter. In the fifth embodiment, the color filter has known sensor sensitivity at each wavelength, and in accordance with the sensor sensitivity, illumination light is divided into a predetermined number of wavelength bands of R, G, and B, and thus a transmission center wavelength and a half width of each band is determined. The image capturing device excluding the imaging element is configured as described in the image capturing device 1 according to the first embodiment (see FIG. 1). Additionally, an overview of a process performed in the image capturing device, from setting a spectral information acquisition condition until setting an image capturing condition, is similar to the overview of the process performed in the image capturing device 1 according to the first embodiment (see FIG. 5).

Figure 16:
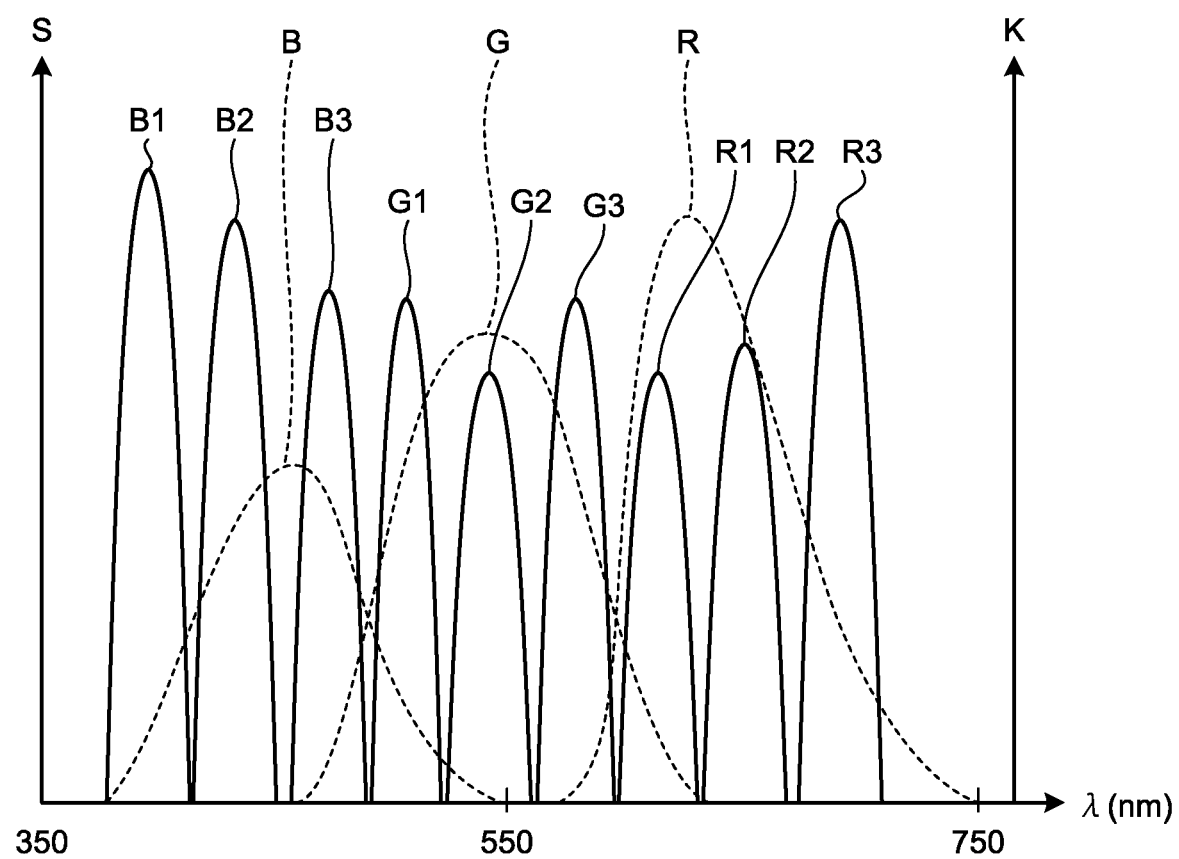
FIG. 16 is a diagram, in an image capturing device according to a fifth embodiment, illustrating a relationship between light receiving sensitivity of an imaging element, a light intensity of illumination light emitted by an illumination unit, and a wavelength of the illumination light emitted by the illumination unit.

FIG. 16 illustrates, in the image capturing device according to the fifth embodiment, a relationship between light receiving sensitivity S of the imaging element, a light intensity K of illumination light emitted by an illumination unit, and a wavelength λ of the illumination light. In FIG. 16, broken lines R, G, and B each indicate a sensitivity S of an R component, a G component, and a B component. In a case illustrated in FIG. 16, the R component, the G component, and the B component, all included in the illumination light, are each divided into three bands. The illumination unit 3 applies the illumination light at three sets of bands, each set including one of the three bands of each of the color components (Ri, Gi, and Bi; i=1 to 3). The illumination unit 3 applies the illumination light at each set of the bands in a time-divided way and three times. With this configuration, the image capturing device according to the fifth embodiment applies the illumination light at nine bands.

As has been described above, an image capturing device according to the fifth embodiment acquires highly accurate spectral information of a subject under an adequate acquisition condition, as with the first embodiment.

The image capturing device according to the fifth embodiment simultaneously emits light including a part of each color component so as to apply the light at a plurality of bands in a short time period. This configuration improves a frame rate in the imaging unit.

Note that the image capturing device according to the fifth embodiment may divide the R, G, and B components into arbitrary M (M is an integral number) bands and irradiate the subject with the illumination light at the 3M bands for a 1/M time period to acquire the spectral information.

Other Embodiment

An embodiment has been described above; however, the present disclosure is not limited to the foregoing first, second, third, fourth, or fifth embodiment. For example, the end condition and the method for changing the spectral information acquisition condition in each of the first to fifth embodiments described above may be selectively switched with one another in the first to fifth embodiments.

The spectral information is not limited to the spectral signal values, and may be any information that reflects a spectral characteristic of the subject and is acquired based on an image captured.

With regard to a group of subjects, each having a similar spectral characteristic to the other, pre-image capturing may be performed only on one of the subjects as a representative to determine an image capturing condition. Then, all the subjects of the group may be subjected to image capturing based on the image capturing condition.

When an end condition is that a variation rate of spectral signal information to a wavelength is above a threshold value predetermined, with regard to a wavelength segment where the variation rate of spectral information is below the threshold value predetermined, the number of bands may be reduced or a half width of each of the bands may be increased. Alternatively, the number of the bands may be reduced and the half width of each of the bands may be increased concurrently. This configuration reduces the number of the bands at image capturing, thereby speeding up the image capturing and reducing data capacity.

According to the present disclosure, highly accurate spectral information of a subject can be acquired under an adequate acquisition condition.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing device comprising:
   an illuminator configured to generate illumination light composed of components at a plurality of wavelength bands, each of the components having a characteristic in accordance with a corresponding one of settings, and the plurality of wavelength bands being four or more wavelength bands;

an imager configured to generate an image signal by capturing light from a subject; and a processor comprising hardware, the processor being configured to:
- set an acquisition condition for acquiring spectral information of the subject, the acquisition condition including a condition related to an operation of each of the illuminator and the imager;
- analyze the image signal generated by the imager based on the acquisition condition in order to acquire the spectral information of the subject;
- determine whether or not the acquired spectral information satisfies an end condition for ending acquisition of the spectral information; and
- change the acquisition condition for acquiring the spectral information when the processor determines that the end condition is not satisfied to improve wavelength resolution at at least some of the wavelength bands of the image signal.

2. The image capturing device according to claim 1, wherein the processor is configured to define a wavelength band, at which the wavelength resolution is to be improved, based on change of a signal value of the image signal.

3. The image capturing device according to claim 1, wherein the illuminator includes:
- a filter having a flat plate shape and configured to transmit light at a transmission center wavelength that continuously changes in a direction predetermined;
- a liquid crystal panel located closer to a light exiting side of the filter and configured to selectively transmit the light at some of the wavelength bands among the light transmitted through the filter; and
- a diffusion optical system located closer to a light exiting side of the liquid crystal panel and configured to diffuse the light transmitted through the liquid crystal panel to equalize the light, and the liquid crystal panel is capable of changing the wavelength bands of the light that the liquid crystal panel transmits.

4. The image capturing device according to claim 1, wherein the illuminator is a light source including a plurality of light emitting diodes, each emitting light in four or more colors at a different wavelength band, the plurality of light emitting diodes being two-dimensionally arranged and aligned.

5. A control method executed by an image capturing device including: an illuminator configured to generate illumination light composed of components at a plurality of wavelength bands, each of the components having a characteristic in accordance with a corresponding one of settings, and the plurality of wavelength bands being four or more wavelength bands; and an imager configured to generate an image signal by capturing light from a subject, the control method comprising:
- setting an acquisition condition for acquiring spectral information of the subject by reading, from a memory, the acquisition condition including a condition related to an operation of each of the illuminator and the imager;
- generating the image signal in the imager based on the acquisition condition;
- analyzing the generated image signal in order to acquire the spectral information of the subject;
- determining whether or not the acquired spectral information satisfies an end condition; and
- changing the acquisition condition for acquiring the spectral information when it is determined that the end condition is not satisfied to improve wavelength resolution at at least some of the wavelength bands of the image signal; and
- based on the changed acquisition condition, each of the generating and the analyzing is performed again.

* * * * *